US009317486B1

(12) United States Patent
Story, Jr. et al.

(10) Patent No.: US 9,317,486 B1
(45) Date of Patent: Apr. 19, 2016

(54) SYNCHRONIZING PLAYBACK OF DIGITAL CONTENT WITH CAPTURED PHYSICAL CONTENT

(71) Applicant: AUDIBLE, INC., Newark, NJ (US)

(72) Inventors: Guy Ashley Story, Jr., New York, NY (US); Nathan Garret Brothers, New York, NY (US); Ajay Arora, New York, NY (US); Douglas Scott Goldstein, Riverdale, NJ (US)

(73) Assignee: AUDIBLE, INC., Newark, NJ (US)

( * ) Notice: Subject to any disclaimer, the term of this patent is extended or adjusted under 35 U.S.C. 154(b) by 316 days.

(21) Appl. No.: 13/913,143

(22) Filed: Jun. 7, 2013

(51) Int. Cl.
*G09B 5/00* (2006.01)
*G06F 17/22* (2006.01)

(52) U.S. Cl.
CPC ...................................... *G06F 17/22* (2013.01)

(58) Field of Classification Search
USPC ......................................... 434/167, 169, 317
See application file for complete search history.

(56) References Cited

U.S. PATENT DOCUMENTS

| | | |
|---|---|---|
| 3,892,427 A | 7/1975 | Kraynak et al. |
| 5,203,705 A | 4/1993 | Hardy et al. |
| 5,351,189 A | 9/1994 | Doi et al. |
| 5,533,757 A | 7/1996 | Morris |
| 5,657,426 A | 8/1997 | Waters et al. |
| 5,737,489 A | 4/1998 | Chou et al. |
| 5,877,766 A | 3/1999 | Bates et al. |
| 5,978,754 A | 11/1999 | Kumano |
| 6,076,059 A | 6/2000 | Glickman et al. |
| 6,208,956 B1 | 3/2001 | Motoyama |
| 6,256,610 B1 | 7/2001 | Baum |
| 6,260,011 B1 | 7/2001 | Heckerman et al. |
| 6,356,922 B1 | 3/2002 | Schilit et al. |
| 6,544,040 B1 | 4/2003 | Brelis et al. |

(Continued)

FOREIGN PATENT DOCUMENTS

| | | |
|---|---|---|
| CN | 103988193 A | 8/2014 |
| CN | 104620317 A | 5/2015 |

(Continued)

OTHER PUBLICATIONS

Arar, Yardena, Jan. 7, 2010, Blio E-Book Platform: No Reader (Yet), But Great Graphics.

(Continued)

*Primary Examiner* — Kesha Frisby
(74) *Attorney, Agent, or Firm* — Knobbe, Martens, Olson & Bear LLP

(57) ABSTRACT

A computing device may provide a visual cue to items of content (for example, words in a book) synchronized with the playback of companion content (for example, audio content corresponding to the book). Embodiments of the present disclosure are directed to a content playback synchronization system for use with physical books (or other physical media). In an embodiment, the computing device captures images of the physical book and may display a visual cue (for example, an underline, box, dot, cursor, or the like) to identify a current location in textual content of the captured and displayed images of the physical book corresponding to a current output position of companion audio content. As the audio content is presented (i.e., as it "plays back"), the highlight and/or visual cue may be advanced to maintain synchronization between the output position within the audio content and a corresponding position in the displayed physical textual content.

26 Claims, 6 Drawing Sheets

(56) References Cited

U.S. PATENT DOCUMENTS

| | | |
|---|---|---|
| 6,638,171 B1 | 10/2003 | Igarashi et al. |
| 6,766,294 B2 | 7/2004 | MaGinite et al. |
| 6,865,533 B2 | 3/2005 | Addison et al. |
| 6,886,036 B1 | 4/2005 | Santamäki et al. |
| 6,912,505 B2 | 6/2005 | Linden et al. |
| 6,961,895 B1 | 11/2005 | Beran et al. |
| 7,003,515 B1 | 2/2006 | Glaser et al. |
| 7,107,533 B2 | 9/2006 | Duncan et al. |
| 7,210,102 B1 | 4/2007 | Gordon et al. |
| 7,231,351 B1 | 6/2007 | Griggs |
| 7,313,513 B2 | 12/2007 | Kinder |
| 7,610,204 B2 | 10/2009 | Ruback et al. |
| 7,693,719 B2 | 4/2010 | Chu et al. |
| 7,840,912 B2 | 11/2010 | Elias et al. |
| 7,849,043 B2 | 12/2010 | Woolf et al. |
| 7,870,272 B2 | 1/2011 | Berkowitz et al. |
| 7,877,705 B2 | 1/2011 | Chambers et al. |
| 7,925,993 B2 | 4/2011 | Williams |
| 7,937,380 B2 | 5/2011 | Spiegelman et al. |
| 8,106,285 B2 | 1/2012 | Gerl et al. |
| 8,109,765 B2 | 2/2012 | Beattie et al. |
| 8,131,545 B1 | 3/2012 | Moreno et al. |
| 8,131,865 B2 | 3/2012 | Rebaud et al. |
| 8,150,864 B2 | 4/2012 | Williams et al. |
| 8,317,606 B2 | 11/2012 | Graham et al. |
| 8,412,718 B1 | 4/2013 | Bilger |
| 8,434,685 B1 | 5/2013 | Lewbel et al. |
| 8,442,423 B1 | 5/2013 | Ryan et al. |
| 8,452,797 B1 | 5/2013 | Paleja et al. |
| 8,504,906 B1 | 8/2013 | Xu |
| 8,512,042 B2 | 8/2013 | Rogan et al. |
| 8,515,737 B2 | 8/2013 | Allen |
| 8,517,738 B2 | 8/2013 | Sheehan et al. |
| 8,527,272 B2 | 9/2013 | Qin et al. |
| 8,548,618 B1 | 10/2013 | Story, Jr. et al. |
| 8,577,668 B2 | 11/2013 | Rosart et al. |
| 8,798,366 B1 | 8/2014 | Jones et al. |
| 8,849,676 B2 | 9/2014 | Goldstein et al. |
| 8,855,797 B2 | 10/2014 | Story, Jr. et al. |
| 8,861,925 B1 | 10/2014 | Ohme |
| 8,862,255 B2 | 10/2014 | Story, Jr. et al. |
| 8,948,892 B2 | 2/2015 | Story, Jr. et al. |
| 8,972,265 B1 | 3/2015 | Lester |
| 9,037,956 B2 | 5/2015 | Goldstein et al. |
| 9,099,089 B2 | 8/2015 | Dzik et al. |
| 9,141,257 B1 | 9/2015 | Goldstein et al. |
| 2002/0002459 A1 | 1/2002 | Lewis et al. |
| 2002/0007349 A1 | 1/2002 | Yuen |
| 2002/0041692 A1 | 4/2002 | Seto et al. |
| 2002/0046023 A1 | 4/2002 | Fujii et al. |
| 2002/0054073 A1 | 5/2002 | Yuen |
| 2002/0116188 A1 | 8/2002 | Amir et al. |
| 2002/0184189 A1 | 12/2002 | Hay et al. |
| 2003/0023442 A1 | 1/2003 | Akabane et al. |
| 2003/0061028 A1 | 3/2003 | Dey et al. |
| 2003/0077559 A1 | 4/2003 | Braunberger et al. |
| 2003/0078856 A1 | 4/2003 | Zubi |
| 2003/0083885 A1 | 5/2003 | Frimpong-Ansah |
| 2003/0115289 A1 | 6/2003 | Chinn et al. |
| 2003/0158855 A1 | 8/2003 | Farnham et al. |
| 2004/0003042 A1 | 1/2004 | Horvitz et al. |
| 2004/0078786 A1 | 4/2004 | Hoolahan et al. |
| 2004/0168121 A1 | 8/2004 | Matz |
| 2004/0243403 A1 | 12/2004 | Matsunaga et al. |
| 2004/0261093 A1 | 12/2004 | Rebaud et al. |
| 2005/0005308 A1 | 1/2005 | Logan et al. |
| 2005/0022113 A1 | 1/2005 | Hanlon |
| 2005/0086211 A1 | 4/2005 | Mayer |
| 2005/0187910 A1 | 8/2005 | Kladko |
| 2005/0276570 A1 | 12/2005 | Reed et al. |
| 2006/0014129 A1 | 1/2006 | Coleman et al. |
| 2006/0064733 A1 | 3/2006 | Norton et al. |
| 2006/0111909 A1 | 5/2006 | Maes et al. |
| 2006/0112131 A1 | 5/2006 | Harrold et al. |
| 2006/0122984 A1 | 6/2006 | Byers et al. |
| 2006/0148569 A1 | 7/2006 | Beck |
| 2006/0190559 A1 | 8/2006 | Lim |
| 2007/0005651 A1 | 1/2007 | Levin et al. |
| 2007/0016314 A1 | 1/2007 | Chan et al. |
| 2007/0061487 A1 | 3/2007 | Moore et al. |
| 2007/0074619 A1 | 4/2007 | Vergo |
| 2007/0118378 A1 | 5/2007 | Skuratovsky |
| 2007/0124298 A1 | 5/2007 | Agrawal |
| 2007/0136459 A1 | 6/2007 | Roche et al. |
| 2007/0219968 A1 | 9/2007 | Frank |
| 2007/0219983 A1 | 9/2007 | Fish |
| 2007/0276657 A1 | 11/2007 | Gournay et al. |
| 2007/0281285 A1 | 12/2007 | Jayaweera |
| 2007/0282607 A1 | 12/2007 | Bond et al. |
| 2007/0282844 A1 | 12/2007 | Kim et al. |
| 2008/0005656 A1 | 1/2008 | Pang et al. |
| 2008/0021894 A1 | 1/2008 | Styles |
| 2008/0027726 A1 | 1/2008 | Hansen et al. |
| 2008/0039163 A1 | 2/2008 | Eronen et al. |
| 2008/0114601 A1 | 5/2008 | Boyle et al. |
| 2008/0120312 A1 | 5/2008 | Reed et al. |
| 2008/0141126 A1 | 6/2008 | Johnson et al. |
| 2008/0154593 A1 | 6/2008 | Da Palma et al. |
| 2008/0163039 A1 | 7/2008 | Ryan et al. |
| 2008/0168073 A1 | 7/2008 | Siegel et al. |
| 2008/0177822 A1 | 7/2008 | Yoneda |
| 2008/0189099 A1 | 8/2008 | Friedman et al. |
| 2008/0243828 A1 | 10/2008 | Reztlaff et al. |
| 2008/0280272 A1 | 11/2008 | Titus |
| 2008/0294453 A1 | 11/2008 | Baird-Smith et al. |
| 2008/0294782 A1 | 11/2008 | Patterson |
| 2009/0006096 A1 | 1/2009 | Li et al. |
| 2009/0006336 A1 | 1/2009 | Forstall et al. |
| 2009/0047003 A1 | 2/2009 | Yamamoto |
| 2009/0124272 A1 | 5/2009 | White et al. |
| 2009/0136213 A1 | 5/2009 | Calisa et al. |
| 2009/0165140 A1 | 6/2009 | Robinson et al. |
| 2009/0165634 A1 | 7/2009 | Mahowald |
| 2009/0172543 A1 | 7/2009 | Cronin et al. |
| 2009/0210213 A1 | 8/2009 | Cannon et al. |
| 2009/0222520 A1 | 9/2009 | Sloo et al. |
| 2009/0228570 A1 | 9/2009 | Janik et al. |
| 2009/0233705 A1 | 9/2009 | Lemay et al. |
| 2009/0276215 A1 | 11/2009 | Hager |
| 2009/0281645 A1 | 11/2009 | Kitahara et al. |
| 2009/0282093 A1 | 11/2009 | Allard et al. |
| 2009/0298019 A1 | 12/2009 | Rogan et al. |
| 2009/0305203 A1 | 12/2009 | Okumura et al. |
| 2009/0319181 A1 | 12/2009 | Khosravy et al. |
| 2009/0319273 A1 | 12/2009 | Mitsui et al. |
| 2009/0326948 A1 | 12/2009 | Agarwal et al. |
| 2010/0023485 A1 | 1/2010 | Cheng Chu |
| 2010/0042411 A1 | 2/2010 | Addessi et al. |
| 2010/0042682 A1 | 2/2010 | Kaye |
| 2010/0042702 A1 | 2/2010 | Hanses |
| 2010/0049349 A1 | 2/2010 | Deng |
| 2010/0064218 A1 | 3/2010 | Bull et al. |
| 2010/0070575 A1 | 3/2010 | Bergquist et al. |
| 2010/0122174 A1 | 5/2010 | Snibbe et al. |
| 2010/0203970 A1 | 8/2010 | Hope |
| 2010/0211199 A1 | 8/2010 | Naik et al. |
| 2010/0218094 A1 | 8/2010 | Ofek et al. |
| 2010/0225809 A1 | 9/2010 | Connors et al. |
| 2010/0231537 A1 | 9/2010 | Pisula et al. |
| 2010/0279822 A1 | 11/2010 | Ford |
| 2010/0286979 A1 | 11/2010 | Zangvil et al. |
| 2010/0287256 A1 | 11/2010 | Neilio |
| 2010/0318357 A1 | 12/2010 | Istvan et al. |
| 2011/0066438 A1 | 3/2011 | Lindahl et al. |
| 2011/0067082 A1 | 3/2011 | Walker |
| 2011/0067099 A1 | 3/2011 | Barton et al. |
| 2011/0087802 A1 | 4/2011 | Witriol et al. |
| 2011/0099392 A1 | 4/2011 | Conway |
| 2011/0119572 A1 | 5/2011 | Jang et al. |
| 2011/0119590 A1 | 5/2011 | Seshadri |
| 2011/0145275 A1 | 6/2011 | Stewart |
| 2011/0153330 A1 | 6/2011 | Yazdani et al. |
| 2011/0164058 A1 | 7/2011 | Lemay |
| 2011/0173214 A1 | 7/2011 | Karim |

(56) References Cited

U.S. PATENT DOCUMENTS

| | | |
|---|---|---|
| 2011/0177481 A1 | 7/2011 | Haff et al. |
| 2011/0184738 A1 | 7/2011 | Kalisky et al. |
| 2011/0191105 A1 | 8/2011 | Spears |
| 2011/0195388 A1 | 8/2011 | Henshall et al. |
| 2011/0231474 A1 | 9/2011 | Locker et al. |
| 2011/0246175 A1 | 10/2011 | Yi et al. |
| 2011/0246383 A1 | 10/2011 | Gibson et al. |
| 2011/0248959 A1 | 10/2011 | Diehl |
| 2011/0261030 A1 | 10/2011 | Bullock |
| 2011/0288861 A1 | 11/2011 | Kurzweil et al. |
| 2011/0288862 A1 | 11/2011 | Todic |
| 2011/0295843 A1 | 12/2011 | Ingrassia, Jr. et al. |
| 2011/0296287 A1 | 12/2011 | Shahraray et al. |
| 2011/0320189 A1 | 12/2011 | Carus et al. |
| 2012/0001923 A1 | 1/2012 | Weinzimmer et al. |
| 2012/0023447 A1 | 1/2012 | Hoshino et al. |
| 2012/0030288 A1 | 2/2012 | Burckart et al. |
| 2012/0047437 A1 | 2/2012 | Chan |
| 2012/0054813 A1 | 3/2012 | Carmichael |
| 2012/0092329 A1 | 4/2012 | Koo et al. |
| 2012/0109640 A1 | 5/2012 | Anisimovich et al. |
| 2012/0124505 A1 | 5/2012 | St. Jacques, Jr. |
| 2012/0144294 A1 | 6/2012 | Amano et al. |
| 2012/0150935 A1 | 6/2012 | Frick et al. |
| 2012/0158706 A1 | 6/2012 | Story, Jr. et al. |
| 2012/0166180 A1 | 6/2012 | Au |
| 2012/0173659 A1 | 7/2012 | Thaxter et al. |
| 2012/0191726 A1 | 7/2012 | Markus et al. |
| 2012/0197998 A1 | 8/2012 | Kessel et al. |
| 2012/0204086 A1 | 8/2012 | Stoner et al. |
| 2012/0210203 A1 | 8/2012 | Kandekar et al. |
| 2012/0236201 A1 | 9/2012 | Larsen et al. |
| 2012/0245719 A1 | 9/2012 | Story, Jr. et al. |
| 2012/0245720 A1 | 9/2012 | Story, Jr. et al. |
| 2012/0245721 A1 | 9/2012 | Story, Jr. et al. |
| 2012/0310642 A1 | 12/2012 | Cao et al. |
| 2012/0311465 A1 | 12/2012 | Nealer et al. |
| 2012/0311625 A1 | 12/2012 | Nandi |
| 2012/0315009 A1 | 12/2012 | Evans et al. |
| 2012/0324324 A1 | 12/2012 | Hwang et al. |
| 2013/0013991 A1 | 1/2013 | Evans |
| 2013/0030853 A1 | 1/2013 | Agarwal et al. |
| 2013/0036140 A1 | 2/2013 | Bowes |
| 2013/0041747 A1 | 2/2013 | Anderson et al. |
| 2013/0073449 A1 | 3/2013 | Voynow et al. |
| 2013/0073675 A1 | 3/2013 | Hwang et al. |
| 2013/0074133 A1 | 3/2013 | Hwang et al. |
| 2013/0080881 A1 | 3/2013 | Goodspeed et al. |
| 2013/0090914 A1 | 4/2013 | White |
| 2013/0091429 A1 | 4/2013 | Weng et al. |
| 2013/0103814 A1 | 4/2013 | Carrasco et al. |
| 2013/0124988 A1 | 5/2013 | Lettau |
| 2013/0130216 A1 | 5/2013 | Morton et al. |
| 2013/0151954 A1 | 6/2013 | Ierullo |
| 2013/0171603 A1* | 7/2013 | Self et al. ............... 434/317 |
| 2013/0191708 A1 | 7/2013 | Song et al. |
| 2013/0212454 A1 | 8/2013 | Casey |
| 2013/0253833 A1 | 9/2013 | Tuukkanen |
| 2013/0257871 A1 | 10/2013 | Goldstein et al. |
| 2013/0262127 A1 | 10/2013 | Goldstein et al. |
| 2013/0268826 A1 | 10/2013 | Nowakowski et al. |
| 2013/0293707 A1* | 11/2013 | Kwong ............... G06F 3/0483 348/143 |
| 2013/0332167 A1 | 12/2013 | Kilgore |
| 2014/0005814 A1 | 1/2014 | Hwang et al. |
| 2014/0039887 A1 | 1/2014 | Dzik et al. |
| 2014/0040713 A1 | 2/2014 | Dzik et al. |
| 2014/0149867 A1 | 5/2014 | McCaddon et al. |
| 2014/0195241 A1 | 7/2014 | Nguyen et al. |
| 2014/0223272 A1 | 8/2014 | Arora et al. |
| 2014/0250219 A1 | 9/2014 | Hwang |
| 2015/0026577 A1 | 1/2015 | Story et al. |
| 2015/0067459 A1 | 3/2015 | Lester |
| 2015/0261747 A1 | 9/2015 | Goldstein et al. |
| 2015/0340038 A1 | 11/2015 | Dzik et al. |

FOREIGN PATENT DOCUMENTS

| | | |
|---|---|---|
| CN | 104662604 A | 5/2015 |
| EP | 2689342 | 1/2014 |
| EP | 2689346 | 1/2014 |
| EP | 2867895 | 5/2015 |
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 A | 7/2005 |
| JP | 2007-522591 | 8/2007 |
| JP | 2007-249703 | 9/2007 |
| JP | 2010-250023 | 11/2010 |
| NZ | 532174 | 1/2007 |
| SG | 193537 | 10/2013 |
| SG | 193567 | 11/2013 |
| WO | WO 2006/029458 A1 | 3/2006 |
| WO | WO 2011/144617 | 11/2011 |
| WO | WO 2011/151500 | 12/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |
| WO | WO 2015/034718 | 3/2015 |

OTHER PUBLICATIONS

Beattie, Valerie et al., "Reading Assistant: Technology for Guided Oral Reading", Scientific Learning, Apr. 10, 2012, 5 pages.

Hwang et al., U.S. Appl. No. 13/759,901, filed Feb. 5, 2013, entitled "Synchronizing Playback of Digital Content With Physical Content."

International Search Report re International Application No. PCT/US13/33935 mailed on Jul. 3, 2013.

Levinson, S.E. et al., "Continuous Speech Recognition from a Phonetic Transcription", Acoustics, Speech, and Signal Processing, Apr. 1990, pp. 190-199.

Vignoli, Fabio et al., Aug. 7-10, 1999, A Text-Speech Synchronization Technique With Applications to Talking Heads, Auditory-Visual Speech Processing, ISCA Archive.

Office Action in Japanese Application No. 2014-501257 dated Aug. 25, 2014.

Office Action in Japanese Application No. 2014-501254 dated Oct. 14, 2014.

International Search Report issued in connection with International Application No. PCT/US2013/39757 mailed on Oct. 29, 2013.

International Search Report issued in connection with International Application No. PCT/US2013/47866 mailed on Sep. 9, 2013.

International Preliminary Report on Patentability in PCT/US2013/042903 mailed Dec. 11, 2014.

International Search Report and Written Opinion in PCT/US2014/52862 mailed Dec. 9, 2014.

Story, Jr., et al., U.S. Appl. No. 12/881,021, filed Sep. 13, 2010, entitled Systems and Methods for Associating Stories With Related Referents.

International Search Report issued in connection with International Patent Application No. PCTUS12/30186 mailed on Jun. 20, 2012, 12 pages.

International Search Report and Written Opinion in PCT/US2013/042903 mailed Feb. 7, 2014.

International Search Report issued in connection with International Application No. PCT/US13/53020 mailed on Dec. 16, 2013.

International Preliminary Report on Patentability issued in connection with International Patent Application No. PCT/US12/30198 mailed on Jan. 30, 2014, 8 pages.

International Search Report and Written Opinion in PCT/US2014/014508 mailed Jun. 25, 2014.

Dzik, Steven Charles, U.S. Appl. No. 13/662,306, filed Oct. 26, 2012, entitled "Content Presentation Analysis."

(56) References Cited

OTHER PUBLICATIONS

Dzik et al., U.S. Appl. No. 13/604,486, filed Sep. 5, 2012, entitled "Selecting Content Portions for Alignment."

Dzik et al., U.S. Appl. No. 13/604,482, filed Sep. 5, 2012, entitled "Identifying Corresponding Regions of Content."

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Goldstein et al., U.S. Appl. No. 13/535,260, filed Jun. 27, 2012, entitled "Conveying Questions With Content."

Goldstein et al., U.S. Appl. No. 13/434,538, filed Mar. 29, 2012, entitled "Content Customization."

Hwang et al., U.S. Appl. No. 13/536,711, filed Jun. 28, 2012, entitled "Pacing Content."

Hwang, Douglas, U.S. Appl. No. 13/465,853, filed May 7, 2012, entitled "Content Customization."

Kessel et al, U.S. Appl. No. 12/273,473, filed Nov. 18, 2008, entitled "Synchronization of Digital Content."

Lester, Kevin S., U.S. Appl. No. 13/526,343, filed Jun. 18, 2012, entitled "Multiple Voices in Audio Content."

Munroe, Randall, "My Hobby: Embedding NP-Complete Problems in Restaurant Orders," Jul. 9, 2007, http://xkcd.com/287.

Roub, Paul, "I'll Buy an E-book Reader When . . . ", Nov. 16, 2007, available at: http://roub.net/blahg/2007/11/16/ill-buy-an-eboo/ (accessed Sep. 6, 2012), 2 pages.

Ryan et al., U.S. Appl. No. 12/360,044, filed Jan. 26, 2009, entitled "Testing Within Digital Media Itmes."

Simonite, Tom, "Software Translates Your Voice into Another Language," Technology Review, Mar. 9, 2012, available at www.technologyreview.com/computing/39885/page1, last accessed Mar. 14, 2012.

Story, Jr. et al, U.S. Appl. No. 13/070,422, filed Mar. 23, 2011, entitled "Managing Playback of Synchronized Content."

Story, Jr. et al., U.S. Appl. No. 13/070,313, filed Mar. 23, 2011, entitled "Synchronizing Digital Content."

Story, Jr. et al, U.S. Appl. No. 12/972,058, filed Dec. 17, 2010, entitled "Graphically Representing Associations Between Referents and Stories."

Story, Jr. et al., U.S. Appl. No. 12/881,021, filed Sep. 13, 2010, entitled "Systems and Methods for Associating Stories With Related Referents."

Weber, Frederick V., U.S. Appl. No. 13/531,376, filed Jun. 22, 2012, entitled "Modelling Expected Errors for Discriminative Training."

Zhong et al., "Energy Efficiency of Handheld Computer Interfaces: Limits, Characterization and Practice", MobiSys '05, Proceedings of the 3rd international conference on Mobile Systems, applications, and services, 2005, pp. 247-260.

International Search Report issued for PCT/US12/30198 mailed on Jun. 20, 2012, 16 pages.

"Speech Synthesis Markup Language," http://en.wikipedia.org/wiki/Speech_Synthesis_Markup_Language, last modified Feb. 12, 2011, last accessed Mar. 5, 2012.

"Speech Synthesis Markup Language," http://en.wikipedia.org/wiki/Speech_Synthesis, last modified Feb. 22, 2012, last accessed Mar. 5, 2012.

Extended Search Report in European Application No. (12761404.8) dated Jan. 26, 2015.

Office Action in Japanese Application No. 2014-501254 dated May 11, 2015.

Office Action in Canadian Application No. 2830622 dated Jun. 10, 2015.

Extended Search Report in European Application No. 12761104.4 dated Apr. 20, 2015.

Office Action in Canadian Application No. 2830906 dated Mar. 17, 2015.

Office Action in Japanese Application No. 2014-501257 dated Apr. 6, 2015.

International Preliminary Report on Patentability in PCT/US2013/47866 mailed Jan. 8, 2015.

International Preliminary Report issued in connection with International Application No. PCT/US13/53020 mailed on Feb. 12, 2015.

International Preliminary Search Report on Patentability in PCT/US2014/014508 mailed Aug. 4, 2015.

\* cited by examiner

SYNCHRONIZING PLAYBACK OF DIGITAL CONTENT WITH CAPTURED PHYSICAL CONTENT

BACKGROUND

Generally described, user computing devices may facilitate the playback or display of items of content, such as audio books, electronic books, songs, videos, television programs, computer and video games, multi-media content, and the like. For example, an electronic audio player may play an audio book through speakers or headphones.

In some instances, a user may be interested in consuming multiple items of content at the same time. For example, a user may wish to read a physical book while listening to an audio book of the same title, such as *A Christmas Carol*. The physical book and the audio book (or more generally, any group of two or more items of content related to the same content title) may be referred to as "companion" or "corresponding" items of content.

However, in many current approaches, the user must manually line up the two companion items of content so that the words narrated in the audio book correspond to what the user is reading in the physical book. For example, the user may find it necessary to pause the audio book manually during portions of the physical book that have no counterpart in the audio book. Likewise, the user may find it necessary to manually fast-forward the audio book during portions of the audio book that have no counterpart in the physical book. Additionally, the user may find it necessary to search through the physical book to find the portion of the text that is currently being narrated in the audio book. This scheme may prove frustrating and inconvenient for users.

BRIEF DESCRIPTION OF THE DRAWINGS

The following aspects and many of the attendant advantages of the disclosure will become more readily appreciated as the same become better understood by reference to the following detailed description, when taken in conjunction with the accompanying drawings, wherein.

DETAILED DESCRIPTION

Figure 1A:
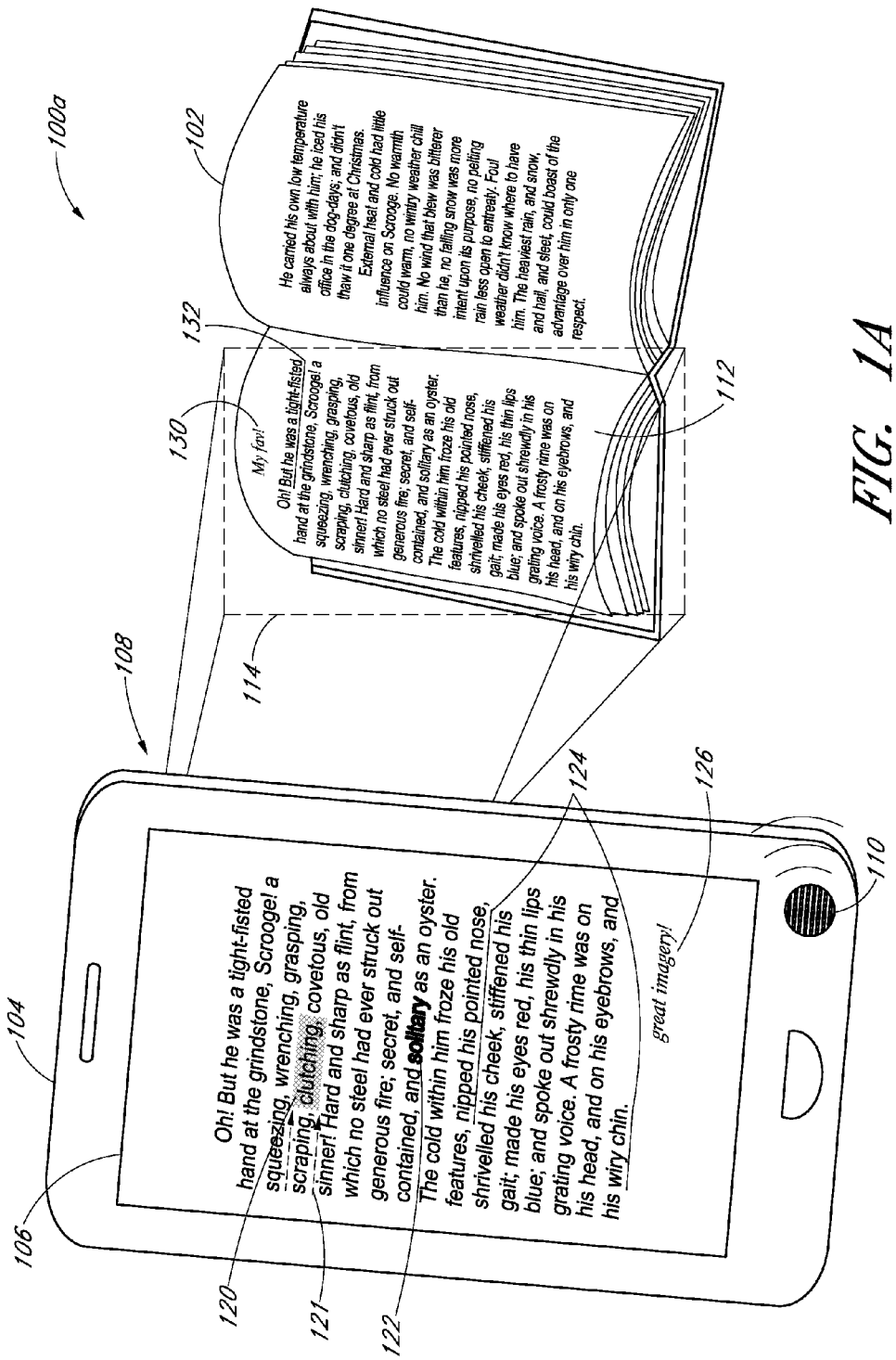
FIGS. 1A and 1B illustrate examples of a content playback synchronization system in operation, according to embodiments of the present disclosure.

Generally described, aspects of the present disclosure relate to using a computing device, including a camera and a display, to synchronize playback of an item of digital content with a display of an item of physical content. More specifically, computer systems and methods are disclosed for providing a visual and/or tactile cue (also referred to herein as a "user perceptible cue") to display of an item of physical content that is synchronized to the playback of an item of companion and/or corresponding digital content. For example, embodiments of the present disclosure are directed to a content playback synchronization system for use with physical books (or other physical media) and companion audio books. The content playback synchronization system may include a synchronization device that captures images of pages of a physical book and generates a visual and/or tactile cue that identifies words in the captured images as corresponding words in the companion audio book are being audibly output by the computing device.

In one embodiment, the synchronization device is embodied in a computing device, for example a smartphone or tablet, having a display screen and a camera. The synchronization device may be positioned anywhere in relation to the physical book such that pages of the physical book may be captured by the camera of the synchronization device. A page of the physical book is captured by the synchronization device, processed, and then displayed on the display screen. Words on the page displayed on the display screen are illuminated or highlighted as the corresponding words in the companion audio book are output or played back. Accordingly, as the user listens to the words in the companion audio book being output by the computing device, the user may simultaneously read the corresponding words on the displayed page that are synchronously illuminated or highlighted. When the end of a page is reached, the synchronization device may pause and/or suspend playback of the companion audio book, and then resume playback of the audio book and synchronous illumination or highlighting of another captured page from the physical book when the user turns to the next page of the physical book.

In addition to, or in lieu of, illuminating. highlighting, or emphasizing the words or text of captured physical content during synchronous presentation with companion digital content, the synchronization device may provide other visual or tactile cues. For example, indicators may be shown on the displayed page above, below, or on the relevant text. Alternatively, the synchronization device may draw a box or circle around the text, draw a line under the text, alter an emphasis level of the text, re-render the text (for example, rendering text in three-dimensions, rendering text in a different typeface, among others), among other possibilities. In another embodiment, the synchronization device may identify successive items of displayed content in animated fashion through, for example, changing illumination colors, increasing or decreasing the intensity of illumination or highlighting, magnifying content, re-rendering content (for example, rendering content in three-dimensions, rendering content in a different typeface, among others), emphasizing content, and/or changing typefaces, among others. Alternatively, any combination of the foregoing may be used.

In an embodiment, the synchronization device may provide a type of augmented reality for physical book interactions. For example, the synchronization device may provide a real-time view of images and/or video captured by the camera, overlaid with relevant and/or supplemental content and/or information. In an example, as the user views a physical book through the synchronization device, additional information and/or supplemental content regarding the physical book is displayed (for example, author information, publisher information, edition information, number of pages, and/or character information, among others). In another example, the synchronization device may provide an indication to the user of the location in the physical book at which reading was last stopped. The synchronization device may provide an overlaid indication (such as an arrow and/or tag) on the physical book, as viewed through the synchronization device, of the page and/or location in the book at which reading was last suspended and/or stopped.

Further, in an embodiment, the synchronization device may include additional information and/or indicators on a displayed page above, below, or on the relevant text. In an embodiment, the content playback synchronization system may extract handwritten notes and/or markings from a page of the physical book, and store those handwritten notes and/or markings in a database from which they may later be retrieved. Extracted handwritten markings may or may not be displayed on the captured page shown on the synchronization device. In an embodiment, a user of the synchronization device may select whether or not to view handwritten markings present in the physical book, and/or other handwritten markings that may have been captured from other physical books. In another embodiment, the user may provide electronic markings and/or notes through the synchronization device. For example, the user may underline a passage of text on the synchronization device by selecting the relevant text with a cursor and/or touch input. Extracted handwritten and/or electronic marking may be synchronized and/or communicated to and from, for example, a server. Thus, markings (for example, notes, highlighting, and/or underlining, among others) may be aggregated and/or presented to multiple users of the content playback synchronization system. Embodiments of systems and methods of communicating, aggregating, and/or synchronizing user markings may be found in, for example, U.S. Pat. No. 7,925,993 ("the ''993 patent"), issued Apr. 12, 2011, entitled "METHOD AND SYSTEM FOR AGGREGATING AND PRESENTING USER HIGHLIGHTING OF CONTENT," which is hereby incorporated by reference in its entirety and for all purposes. In the present disclosure, all types of user-produced data, including for example, extracted handwritten markings and notes, and electronically produced notes, markings, and highlighting, may be referred to as "handwritten markings," "handwritten notes," "user-produced data" and/or "user-produced information."

The illuminated or otherwise identified physical content may include any number of, for example, words, letters, syllables, phonemes, morphemes, spaces, sentences, paragraphs, columns, lines, rows, chapters, stanzas, sections, or other natural or predefined visual or textual feature of the physical content. Further, the synchronization device is not limited to identifying text, but may identify other aspects of physical content as well, e.g., images, pictures, equations, tables, and/or bullets, etc. Multiple aspects of physical content (e.g., multiple words at different locations on a page, or an image and words, etc.) may be simultaneously identified by the synchronization device. Those skilled in the art will recognize a myriad of other visual and/or tactile cues for identifying physical content that fall within the spirit and scope of the present disclosure.

As the digital content is presented, the visual and/or tactile cue may be advanced to maintain synchronization between an output position within the digital content and a corresponding position on the displayed physical content. The position in the displayed physical content corresponding to the advancing output position of the digital content may be referred to herein as the advancing position in the displayed physical content. In some embodiments, detection information and/or synchronization information defining the corresponding and advancing positions in the digital content and the displayed physical content is provided to the synchronization device by a remote source, such as a remote content detection and alignment server or other content management system. An embodiment of a system for generating synchronization information for companion content may be found in U.S. Patent Publication No. 2012/0324324 ("the '324 Publication"), published Dec. 20, 2012, entitled "SYNCHRONIZING RECORDED AUDIO CONTENT AND COMPANION CONTENT," which is hereby incorporated by reference in its entirety and for all purposes.

The content detection information and/or synchronization information may include any data related to the synchronous presentation of the displayed physical content (for example, the generation of the visual and/or tactile cue on the displayed page of the physical book) and the companion digital content (for example, the playback of the audio content), so as to enable one or more computing devices to synchronously present the companion content. Content detection information and/or synchronization information may include reference points mapping portions of the detected physical content to corresponding portions of the digital content, or vice versa. In a specific example, content detection and/or synchronization information may include data that can be used to map a segment of text or visibly differentiable entity (for example, a word, line, sentence, figure, chart, icon, or the like) to a timestamp of a corresponding audio recording. In another example, content detection information and/or synchronization information may include data concerning the locations or boundaries of text (or other visibly differentiable entities) on pages of a physical book (or images of captured pages of a physical book), such as spatial coordinates (this data being used for providing the visual cue). The content synchronization information may also include information related to the relative progress of the presentation and/or a state of presentation of the digital content. The synchronous presentation of the companion content may vary as a function of the capabilities and/or configuration of the synchronization device and/or the formats of the content in the content pair. Accordingly, the content detection information and/or synchronization information may be generated in a variety of formats, versions, etc. In addition, the content synchronization information may include any combination of features or data used to synchronize content disclosed in the '324 Publication, U.S. Patent Publication No. 2012/0197998 ("the '998 Publication"), published Aug. 2, 2012, entitled "SYNCHRONIZATION OF DIGITAL CONTENT," U.S. patent application Ser. No. 13/604,482 ("the '483 application"), filed Sep. 5, 2012, entitled "IDENTIFYING CORRESPONDING REGIONS OF CONTENT," and U.S. Patent Publication No. 2012/0245720 ("the '720 Publication"), published Sep. 27, 2012, entitled "MANAGING PLAYBACK OF SYNCHRONIZED CONTENT," each of which is hereby incorporated by reference in its entirety and for all purposes. In the present disclosure, the terms "content detection information," "content synchronization information," and "synchronization information" may be used interchangeably, each referring to the same content detection information and/or synchronization information described above.

The synchronization device may be any computing device capable of capturing and/or otherwise identifying physical content to a user while synchronously outputting companion or corresponding digital content. The computing device may include, but is not limited to, a dedicated device (such as a synchronization device with dedicated hardware and software components), a head mounted device (such as glasses with integrated electronics and/or augmented reality functionality), a handheld device (such as a tablet computer, personal digital assistant (PDA), hybrid PDA/mobile phone, mobile phone, smartphone, electronic book reader, and/or digital media player), a gaming device, and integrated component(s) for inclusion in another device, among others. These computing devices may be associated with any of a number of visual, tactile, or auditory output devices, and may be associated with a number of devices for user input, including, but not limited to, keyboards, mice, trackballs, trackpads, joysticks, input tablets, trackpoints, touch screens, remote controls, game controllers, motion detectors, and the like.

The term "physical" as used in the present disclosure in conjunction with various types of content (for example, as used in the phrase "physical book"), may be understood to differentiate such content from electronic or digital content. For example, in some embodiments a "physical book" and/or "physical content" may be understood to refer primarily to what may also generally be referred to as a "print book" and/or "print content." Illustrative examples of physical content may include hardcover books, softcover books, print magazines, print newspapers, and the like. In addition, physical content should be understood to include any form of visual or tactile content, including text, images, charts, graphs, slides, maps, Braille, embossed images, or any other content capable of being displayed on a physical medium. However, "physical content" may also refer to digital content when presented on the display of a physical device. For example, the synchronization device described herein may be used in conjunction with a physical electronic book reader to illuminate or otherwise identify text in an electronic book being presented on an electronic paper display of the electronic book reader as the synchronization device synchronously outputs the companion audio book. In yet another embodiment, "physical content" may refer to digital content when presented on a display screen of the synchronization device itself.

In addition, digital or electronic content may refer to any content that may be directly or indirectly accessed by a user through any computing device, including, but not limited to, multi-media content, digital images, digital video, audio data (such as audio content), eBooks, electronic documents, electronic publications, computer-executable code, portions of the above, and the like. References to audio content should be understood to include any form of audio content, including audio books, songs, videos, television programs, computer and video games, multi-media content, and/or any other content having an audible component. Moreover, references to sequential content may include any content that may be output in a sequential manner, including an electronic book, image slideshow, presentation slides, displayable text, audio data, video data, and the like. Digital content may be stored on the synchronization device, may be generated by the synchronization device, and/or may be streamed across a network for display and/or output on the synchronization device. Moreover, digital content may be obtained from any of a number of sources, including a network content provider, a local data store, computer readable media, a content generation algorithm (for example, a text-to-speech algorithm) running remotely or locally, or through user input (for example, text entered by a user). For example, in one embodiment, the synchronization device may locally store the companion audio content of *A Christmas Carol* obtained from a local library or online store, or may stream the companion audio content of *A Christmas Carol* from a third party commercial audio book provider.

In an embodiment, the synchronization device may be used in conjunction with analog content. For example, the synchronization device may playback analog content in a manner similar to the playback of digital content as described herein. Examples of such analog content include magnetic tape sound recordings (such as recordings stored on compact cassettes), phonographic sound recordings, magnetic tape video recordings (such as videos stored on VHS tapes), motion pictures on film, and other magnetic and/or analog data recordings. Thus, references to digital content, audio content, companion content, and/or corresponding content in the present disclosure may be understood to include, in certain embodiments, analog content. In these embodiments, content detection information and/or synchronization information may include any data related to the synchronous presentation of displayed and/or captured physical content and the companion analog content. For example, content detection information and/or synchronization information may include time designations and/or reference points mapping portions of the displayed physical content to corresponding portions of the analog content, or vice versa.

Illustratively, FIG. 1A shows an example content playback synchronization system 100a in operation, according to an embodiment of the present disclosure. The example content playback synchronization system 100a includes a physical book 102 and a synchronization device 104. The synchronization device 104 may include a display 106, a rear-facing camera 108, and a speaker 110. In the illustrated embodiment, camera 108 is directed toward the physical book 102 entitled *A Christmas Carol*, where it captures an image of an area 114, including a page 112 of the book 102. The captured image of the area 114 may then be processed by the synchronization device 104, and then presented to a user on the display 106. In various embodiments, processing of the page image may include, for example, identifying the physical book 102, determining the particular page 112 of the book 102, identifying textual content of the page 112 and differentiating that textual content from hand-written markings on the page, extracting handwritten markings from the page image, overlaying markings on the image (for example, highlighting, underlining, and/or electronic representations of handwritten markings, among others), and/or adjusting or manipulating the orientation and/or other alignment or properties of the image so as to present properly oriented textual information on the display 106 (for example, deskewing the image, performing keystone correction to the image, and the like), among others processes. The display 106 may include any type of electronic display, for example, a CRT display, an LCD display (for example, a TFT display), a plasma display, an LED display, an OLED display (for example, an AMOLED display), an e-ink display, or any other type of display capable of displaying an image to a user. Further, the display 106 may include input capabilities, for example, the display may be touch sensitive. In various embodiments, the camera 108 may be mounted on and/or in communication with, the synchronization device 104 from any other location. For example, in an embodiment the camera 108 is mounted on the front or side of the synchronization device 104. In an embodiment, the camera 108 may communicate wirelessly with the synchronization device 104.

As shown in FIG. 1A, the synchronization device 104 may display the captured page 112 to the user on the display 106. The synchronization device 104 may further determine that notes 130 and underlining 132 are not part of the textual content of the book 102, and so may optionally remove that content from the image shown on the display 106. The displayed image may include overlays including highlighted word 120, bolded word 122, underlining 124, and/or notes 126. As indicated in example content playback synchronization system 100a, the synchronization device 104 is successively highlighting words (as indicated by arrows 121 and the highlighted word "clutching" 120) while associated audio content is being synchronously presented to the user through the speaker 110. The bolded word 122, underlining 124, and notes 126, may be input by the user of the synchronization device 104, and/or may be retrieved by the synchronization device 104 from a remote source. For example, in an embodiment the content playback synchronization system may store extracted, handwritten notes from many different sources (for example, other books), which may then be overlaid on a page image shown to a user. As for the speaker 110, the synchronization device 104 may include, in addition to or in place of, the speaker 110, other devices capable of producing audio output. For example, the synchronization device 104 may include one or more speakers or any of a variety of digital or analog audio capable output ports to other output devices, including, but not limited to, headphone jacks, ¼ inch jacks, XLR jacks, Bluetooth links, stereo jacks, RCA jacks, optical ports, USB ports, and the like.

In some embodiments, the synchronization device 104 may include additional components not explicitly shown in FIG. 1A. For example, the synchronization device 104 may include electronic memory for storing processes, programs, modules, digital content, content detection information and/or synchronization information, and the like. Modules, processes, and/or programs stored in the synchronization device 104 and/or executed by one or more processors of the synchronization device 104 may include, for example, a content processing module and/or a synchronization module. A content processing module may, for example, provide various image manipulations, content highlighting, and/or other processing as described above and below. A synchronization module may, for example, perform various content highlighting and content playback synchronization tasks and/or retrieval of synchronization data functions, among others. In one embodiment, the synchronization device 104 may include a removable memory, such as a Secure Digital (SD) card, that may be used to transfer digital content, detection information, and/or synchronization information to and from the synchronization device 104. The synchronization device 104 may also include one or more processors for retrieving items of digital content, synchronizing presentation of digital content to physical content, and/or communicating with the display 106, the camera 108, the speaker 110, and the like. The various components of the synchronization device 104 may communicate with each other, whether by wired, wireless, or some other type of communication. The synchronization device 104 may further include a communication interface for communicating with, for example, networks and/or other computing devices. For example, such communication interfaces may allow for communications via any wired network, wireless network or combination thereof, and may support communication via WiFi, Bluetooth, Radio Frequency (RF), USB, Near Field Communications (NFC), cellular, satellite or similar communication links. Protocols and components for communicating via the Internet or any of the other aforementioned types of communication links are well known to those skilled in the art of computer communications and thus, need not be described in more detail herein. Such communications devices may be used to retrieve items of audio content from, for example, remote servers, data stores, and the like.

The various components of the synchronization device 104, including the display 106, the camera 108, the speaker 110, as well as the other components described above, may be arranged in any number of ways. For example, in an embodiment, all of the aforementioned components may be arranged in the same packaging or housing. In another embodiment, one or more of the components may or may not be physically connected to the other components. For example, the camera 108 and/or the display 106 may be mounted on the user's head while maintaining wireless communication with processors and memory in the separate housing.

In an embodiment, the synchronization device 104 may be packaged in a head mounted unit. For example, the synchronization device 104 may be included in glasses worn by the user. Other embodiments may include, for example, a wall or ceiling mounted device, a device embedded in a book, magazine, or other media, a device that stands on a table or desk, a chair mounted device, and the like. One skilled in the art will recognize many other configurations that fall within the scope and spirit of the present disclosure.

The user may utilize the synchronization device 104 to obtain an audio book version of, for example, *A Christmas Carol* at the same time, or at a different time, that the user obtains the physical book 102. The audio book may be stored locally on the synchronization device 104 or streamed to the synchronization device from a remote source. The synchronization device 104 may be placed near, and/or attached to the physical book 102. The camera 108 of the synchronization device 104 may be used to obtain an image of the current page of the physical book 102. In one embodiment, the synchronization device 104 provides the page image to a remote content detection and alignment server (described below). The remote server may then process the page image to identify the content and generate content detection information and/or synchronization information for the physical book and companion audio book. The remote server may then provide the content detection information and/or synchronization information to the synchronization device 104. The synchronization device 104 may then output the audio book through the speaker 110, while the synchronization device 104 simultaneously illuminates the corresponding content on the display 106 (for example, as shown at highlighted word 120) based on the content detection information and/or synchronization information. As the audio book is output, the synchronization device 104 may highlight successive, corresponding words on the page image displayed on the display 106, indicating the advancing position in textual content shown in the image. Thus, the synchronization device 104 may synchronously present the audio book with a visual cue identifying the corresponding content of the image captured from the physical book 102. The process by which physical content is identified, companion digital content is retrieved, and presentation of physical and digital content is synchronized, is described in further detail below in reference to FIGS. 3, 4, 5, and 6.

Illustratively, FIG. 2A shows an example content playback synchronization system 100*b* in operation, according to an embodiment of the present disclosure. The example content playback synchronization system 100*b* includes many elements similar to those of the system of FIG. 1A, and thus for clarity only the differences are described.

Figure 1B:
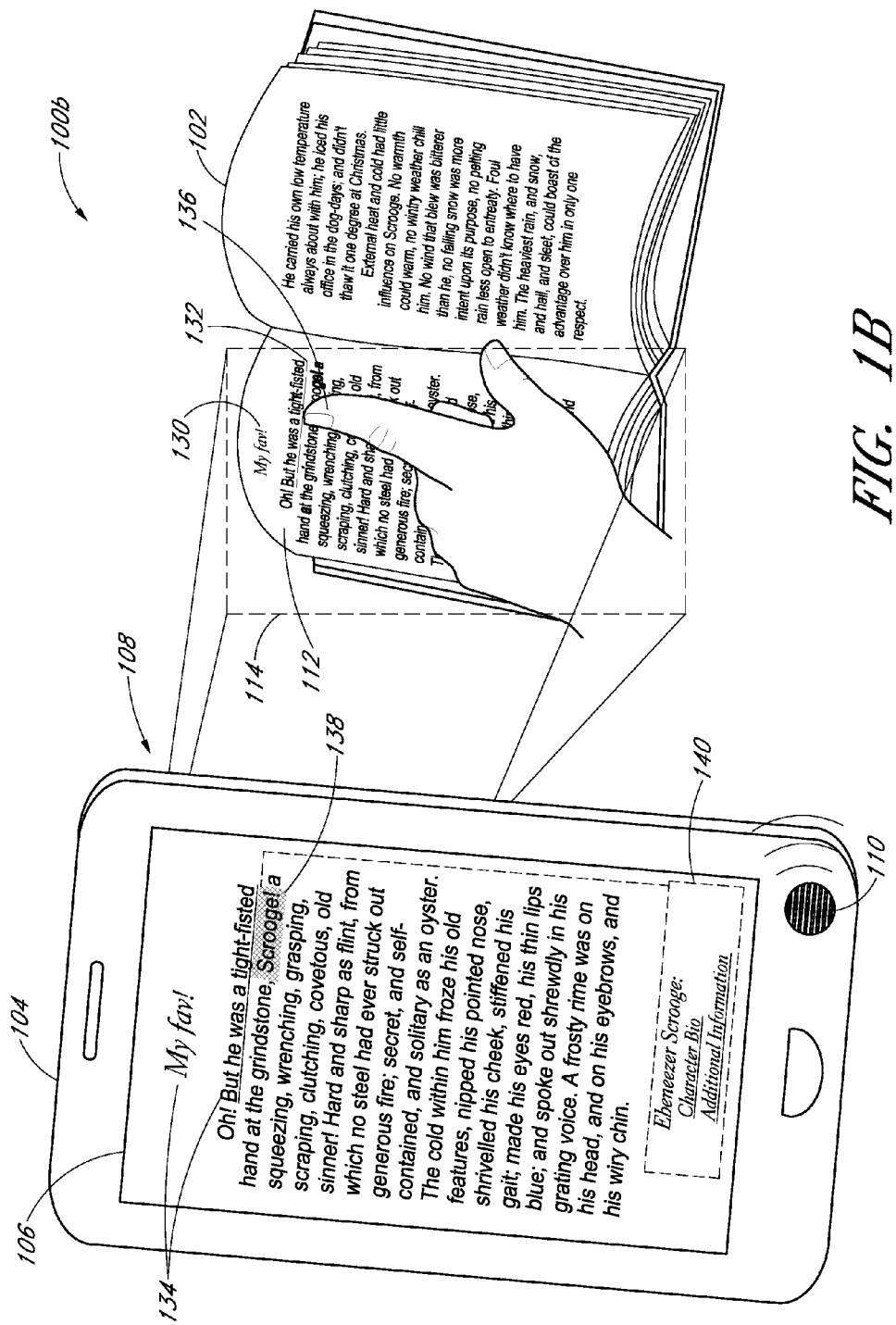

As shown on the display 106 of FIG. 1B, notes 130 and underlining 132 shown on the page 112 are displayed on the page image (see markings 134). In an embodiment, the user of the synchronization device 104 may choose to display markings and/or handwriting on the pages of the physical book 102 on the captured image shown on the display 106. Additionally, in an embodiment the user may gesture on the physical book 102 to perform actions on the synchronization device 104. For example, as shown in FIG. 1B, user finger 136 is touching the word "Scrooge" in the physical book 102. Accordingly, the word is selected on the synchronization device 104 with selected content 138. In an embodiment, selecting words and/or other content in the book 102 may cause display of additional information associated with the selected content on the synchronization device 104. For example, in FIG. 1B supplemental content 140 associated with the selected content 138 is displayed to the user. In various embodiments, the user may perform gestures on the physical book 102 to, for example, begin playback of companion audio content and word highlighting at a particular point, speed up and/or slow down playback of companion content, provide markings and/or highlighting, and the like. Additional examples of methods and processes for implementing user gestures may be found in the '720 Publication, which was previously incorporated by reference herein. In various embodiments, the user may provide input directly to the synchronization device 104 to preform similar functions. For example, the synchronization device 104 may include a touch-enabled display that the user may touch directly to select and/or highlight content, among other inputs.

In an embodiment, the page image displayed on the synchronization device 104 may be derived from an image that is captured and then stored by the synchronization device 104. For example, the page image displayed may comprise a digital rendering of captured physical content. Alternatively, the page image displayed on the synchronization device 104 may be transmitted from the camera to the display substantially real-time. In an embodiment, the page image displayed may not be processed or manipulated, but may be displayed substantially as captured by the camera. In an embodiment, the synchronization device 104 may display multiple page images on the display, and/or may capture multiple pages simultaneously.

Figure 2:
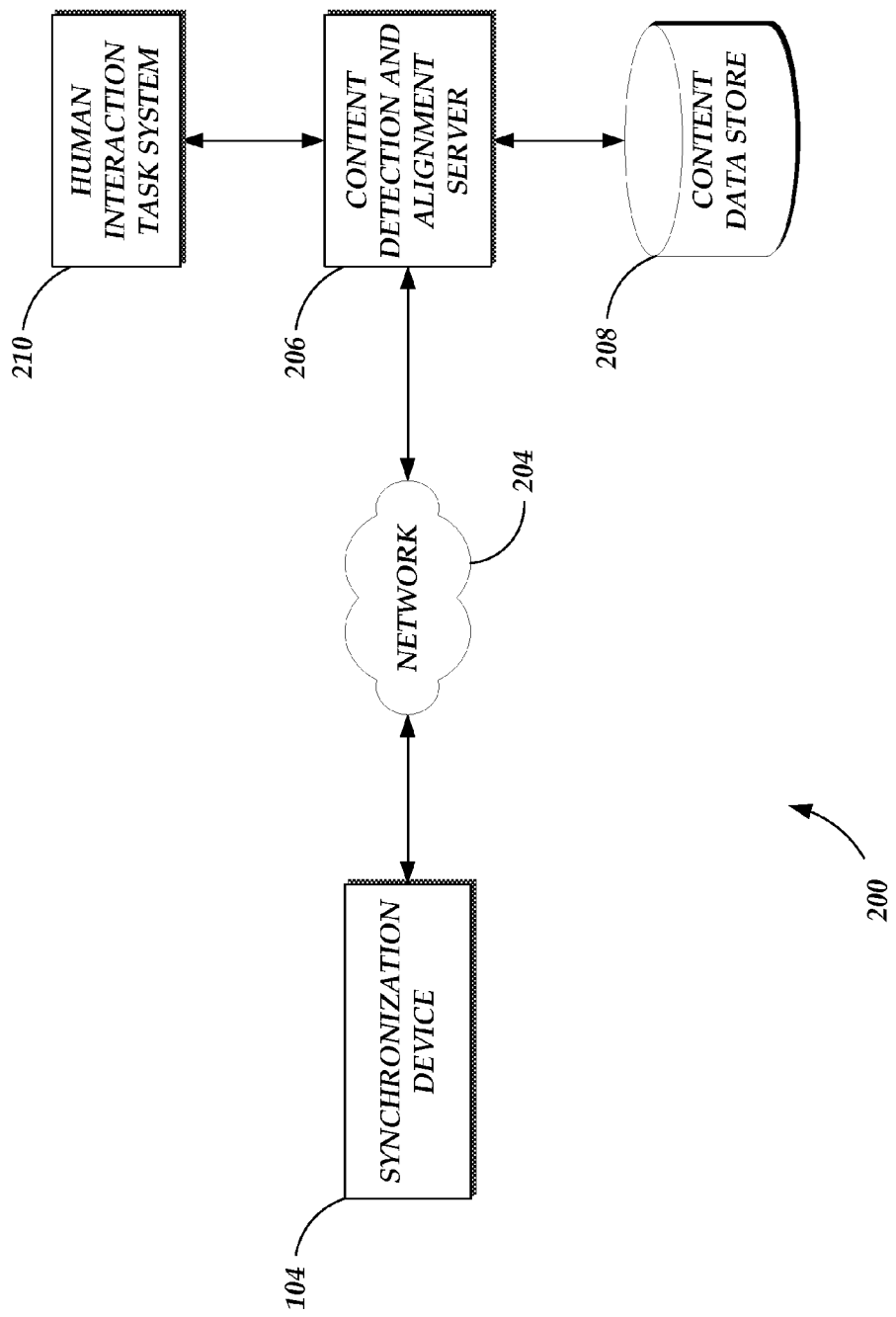
FIG. 2 is a block diagram of an illustrative network environment in which a content playback synchronization system may operate, according to an embodiment of the present disclosure.

Turning to FIG. 2, an illustrative network environment 200 in which the content playback synchronization system may operate according to an embodiment of the present disclosure is shown. The network environment 200 may include a synchronization device 104, a network 204, a human interaction system 210, a content detection and alignment server 206, and a content data store 208. The constituents of the network environment 200 may be in communication with each other either locally or over the network 204.

As noted above, the synchronization device 104 may be any computing device capable capturing and/or otherwise identifying physical content to a user while synchronously outputting companion digital content. The synchronization device 104 may also be capable of communicating over the network 204, for example, to request content synchronization and/or detection information, and/or other content information (for example, audio books and user-created markings and handwriting) from the content detection and alignment server 206. In some embodiments, the synchronization device 104 may include non-transitory computer-readable medium storage for storing content detection and synchronization information and items of content, such as electronic books and audio books. In an embodiment, the content playback synchronization system may include a plurality of synchronization devices, each of which may communicate with each other, and with the network 204.

The network 204 may be any wired network, wireless network, or combination thereof. In addition, the network 204 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The content detection and alignment server 206 is a computing device that may perform a variety of tasks to implement the content detection and alignment of the content playback synchronization system. For example, the content detection and alignment server 206 may align an item of audio content (for example, an audio book) and an item of textual content (for example, a physical book or captured images of pages of a physical book) and generate synchronization information therefrom. The content detection and alignment server 206 may also detect the contents of a page of content, identify the content source, and generate detection information therefrom. This detection and synchronization information may be provided by the content detection and alignment server 206 to the synchronization device 104 over the network 204. Additional operations of the content detection and alignment server 206 are described in further detail with respect to FIG. 3.

The human interaction task system 210 may be included in the network environment 200 to assist the content detection and alignment server 206. Generally described, the human interaction task system 210 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 210 might request a human worker to perform a HIT, e.g., for gathering information or answering a query, and to return the results or answers to the human interaction task system 210 for further processing and/or presentation to the requestor. Thus, in some embodiments, the content detection and alignment server 206 directs the human interaction task system 210 to pose one or more queries about an item of content to a human worker of the human interaction task system 210. For example, a human worker may be asked to compare a transcription of an item of audio content to an item of textual content, or to identify portion boundaries in the item of textual content, such as sentences or paragraphs. The human worker may also be asked to identify or classify front matter, back matter, footnotes, diagrams, tables, graphs, and body text in an item of textual content. The human interaction task system 210 may receive answers to these queries and transmit them to the synchronization device 104 or the content detection and alignment server 206 to guide the operation of the content alignment and detection. The human worker of the human interaction task system 210 may volunteer to respond to these and other tasks and to communicate other information about the item of content to the content detection and alignment server 206.

The content detection and alignment server 206 may be in communication with the content data store 208. The content data store 208 may store one or more items of content, such as, but not limited to, items of audio content (e.g., audio books), items of textual content (e.g., books or other textual content, and/or detected pages of physical books and electronic books), electronic items of extracted user-created markings and handwriting, or other items of content. The content data store 208 may also be configured to store synchronization and detection information generated or obtained by the content detection and alignment server 206. The content data store 208 may be embodied in hard disk drives, solid state memories, and/or any other type of non-transitory, computer-readable storage medium remotely or locally accessible to the content detection and alignment server 206. The content data store 208 may also be distributed or partitioned across multiple storage devices as is known in the art without departing from the spirit and scope of the present disclosure.

Figure 3:
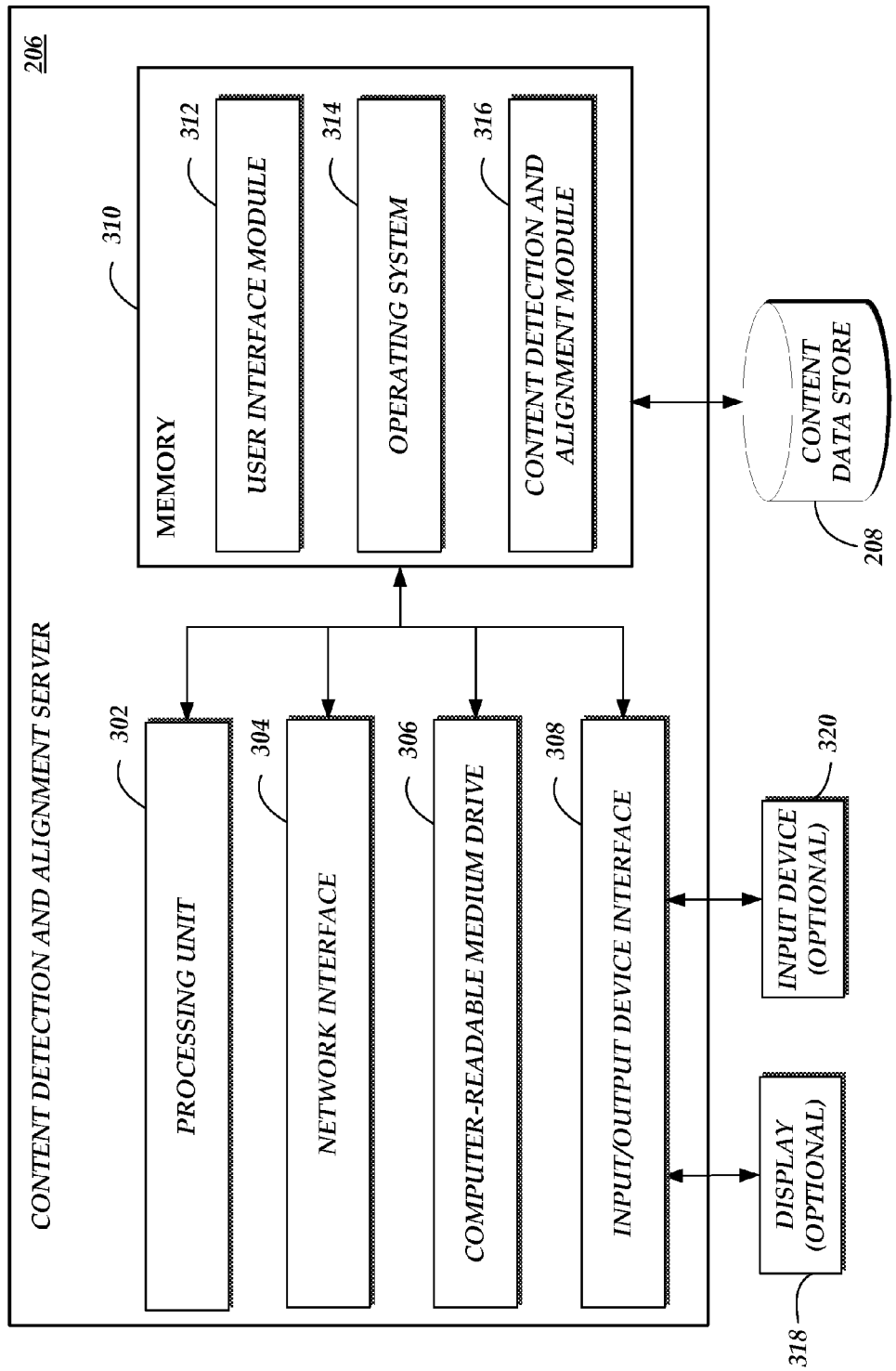
FIG. 3 is a block diagram of an illustrative content detection and alignment server, according to an embodiment of the present disclosure.

FIG. 3 shows a illustrative block diagram of the content detection and alignment server 206, according to an embodiment of the present disclosure. The content detection and alignment server 206 may include an arrangement of computer hardware and software elements that may be used to implement content detection and alignment. FIG. 3 depicts a general architecture of the content detection and alignment server 206 illustrated in FIG. 2. Those skilled in the art will appreciate that the content detection and alignment server 206 may include more (or fewer) components than those shown in FIG. 3. It is not necessary, however, that all of these generally conventional components be shown in order to provide an enabling disclosure.

The content detection and alignment server 206 includes a processing unit 302, a network interface 304, a non-transitory computer-readable medium drive 306, an input/output device interface 308, and a memory 310, all of which may communicate with one another by way of a communication bus. As illustrated, the content detection and alignment server 206 is optionally associated with, or in communication with, an optional display 318 and an optional input device 320. The optional display 318 and optional input device 320 may be used in embodiments in which users interact directly with the content server 206, such as an integrated in-store kiosk or integrated component for inclusion in an automobile, boat, train, or airplane, for example. In other embodiments, the optional display 318 and optional input device 320 may be included in the synchronization device 104 shown in FIG. 2. The network interface 304 may provide content detection and alignment server 206 with connectivity to one or more networks or computing systems. The processing unit 302 may thus receive information and instructions from other computing systems (such as the synchronization device 104) or services via a network. The processing unit 302 may also communicate to and from memory 310 and further provide output information for the optional display 318 via the input/output device interface 308. The input/output device interface 308 may accept input from the optional input device 320, such as a keyboard, mouse, digital pen, touch screen, or gestures recorded via motion capture. The input/output device interface 308 may also output audio data to speakers or headphones (not shown).

The memory 310 contains computer program instructions that the processing unit 302 executes in order to implement one or more embodiments of the content playback synchronization system. The memory 310 generally includes RAM, ROM and/or other persistent or non-transitory computer-readable storage media. The memory 310 may store an operating system 314 that provides computer program instructions for use by the processing unit 302 in the general administration and operation of the content detection and alignment server 206. The memory 310 may further include other information for implementing aspects of the content playback synchronization system. For example, in one embodiment, the memory 310 includes a user interface module 312 that facilitates generation of user interfaces (such as by providing instructions therefor) for display upon a computing device such as the synchronization device 104. For example, a user interface may be displayed via a navigation interface such as a web browser installed on a synchronization device 104. In another example, the content detection and alignment server 206 may perform page image processing and overlay highlighting and markings for display on the synchronization device 104. In addition, memory 310 may include or communicate with the content data store 208. Content stored in the content data store 208 may include various types of items of content as described with respect to FIG. 2.

In addition to the user interface module 312, the memory 310 may include a content detection and alignment module 316 that may be executed by the processing unit 302. In one embodiment, the content detection and alignment module 316 may be used to implement the content detection and alignment, example operations of which are discussed below and with reference to FIGS. 4 and 5.

Those skilled in the art will recognize that in some embodiments, the content detection and alignment is implemented partially or entirely by the synchronization device 104. Accordingly, the synchronization device 104 may include a content detection and alignment module 316 and other components that operate similarly to the components illustrated as part of the content detection and alignment server 206, including a processing unit 302, network interface 304, non-transitory computer-readable medium drive 306, input/output interface 308, memory 310, user interface module 312, and so forth.

It will be recognized that many of the devices described herein are optional and that embodiments of network environment 200 may or may not combine devices. Moreover, synchronization device 104 and/or content detection and alignment server 206 may each be embodied in a plurality of devices, each executing an instance of the respective synchronization device 104 and content detection and alignment server 206. However, devices need not be distinct or discrete. Devices may also be reorganized in the environment 200. For example, the content detection and alignment server 206 may be represented in a single physical server or, alternatively, may be split into multiple physical servers. The entirety of the functions of the content detection and alignment server 206 may be represented in a single synchronization device 104 as well. Additionally, it should be noted that in some embodiments, the functionality of the content detection and alignment server 206 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As discussed above, an image of physical content (such as a book page) may be analyzed to detect the contents of the page, to identify the source of the content, and/or to determine the location of the content on the page. Additionally an item of physical content and an item of digital content (such as an audio book) may be analyzed to determine which portions of the item of physical content substantially match or correspond to portions of the item of digital content. Content detection and synchronization information may be generated that reflects correspondences between portions of the item of digital content and portions of the item of physical content, as well as the locations of physical content. The '324 Publication, the '998 Publication, the '483 application, and the '720 Publication, each of which has been incorporated by reference herein, describe illustrative systems, processes, routines, and/or methods for identifying words in an item textual, physical content that correspond to words in the item of audio content (e.g., words in the textual content that are audibly presented in the item of audio content). These illustrative systems, processes, routines, and/or methods for content detection and alignment may be carried out, for example, in the content detection and alignment module 316 by the content detection and alignment server 206. Additionally, as will be described further below in reference to FIGS. 4 and 5, the content detection and alignment module 316 may include systems, processes, routines, and/or methods for detecting the locations of text on a page, detecting page numbers, determining handwriting or other markings on a page, and/or identifying content (for example, identifying the title of a book based on a picture of its cover, or the textual contents of a page). Illustrative systems, processes, routines, and/or methods for accomplishing these tasks are described in U.S. Pat. No. 8,150,864 ("the '864 patent"), issued Apr. 3, 2012, entitled "AUTOMATED MONITORING AND CONTROL OF ACCESS TO CONTENT FROM A SOURCE," and U.S. Pat. No. 7,210,102 ("the '102 patent"), issued Apr. 24, 2007, entitled "METHOD AND SYSTEM FOR DETERMINING PAGE NUMBERS OF PAGE IMAGES," each of which is hereby incorporated by reference in its entirety.

In various embodiments, the content playback synchronization system highlights (and/or provides a visual cue to) text in an image of a page from a physical book while synchronously outputting a companion audio book. Audio content may be produced by a speaker (such as speaker 110 of FIG. 1A). Further, the physical book may include various other matter that may not be included in the companion audio book, for example, pictures, footnotes, and the like. The content playback synchronization system generates highlighting and/or visual cues on text of the images of the physical book. The synchronization device may also aurally present the companion audio book synchronously via one or more speakers and/or one or more audio outputs, which may be provided to speakers or headphones. Content synchronization information may be used to synchronously present and update the presentation position of both the audio book content and the visual cue. This may include, for example, any combination of features described in reference to the illustrative routines of FIGS. 4 and 5 described below.

Additionally, content detection information may be used by the synchronization device to determine what particular content to highlight so as to synchronize the visual cue with playback of the audio content. In an embodiment, detection information includes the spatial coordinate locations of some or all of the words (or other visibly differentiable entities) on the current page of the physical book. Thus, the visual cue that is generated by the synchronization device may be shown on the correct position on the page image using detection information.

As described above, the visual cue may indicate a presentation position of the audio book content in relation to the corresponding position in image of the page of the physical book. Accordingly, the corresponding text may be illuminated, emphasized, or otherwise identified to indicate the presentation position of the audio book being played back via the speaker. In this regard, text may be highlighted, boxed, underlined, re-rendered, or the like. As noted above, individual words, lines, sentences, and/or other units of text, as well as images, graphs, bullets, etc., may be synchronously illuminated or otherwise identified by visual or tactile cues during playback of the companion audio book. In one embodiment, when playback of the audio book reaches the end of a page of the physical book being presented, playback of the audio book may be paused or suspended. The synchronization device may then detect a page turn of the physical book with the camera or other sensor, and then capture and process an image of the new page and continue with playback of the companion audio book. Alternatively, the synchronization device may prompt the user to turn the page of the book. In other embodiments, the synchronization device provides a mechanism for automatically turning the page of the physical book, such as an actuating arm, among other possibilities known to one having skill in the art.

In some embodiments, a user may select any page of the physical book and start playback at a corresponding point in the companion audio book. For example, the user may navigate to a point in time in the audio book using user controls associated with the synchronization device, and the corresponding page number of the physical book may be displayed to the user by the synchronization device, for example, on the display of the synchronization device. Alternatively, the synchronization device may notify the user aurally of the page number.

As mentioned above, a page of physical content may include pictures, footnotes, or other extra matter that is infrequently narrated in audio content and thus a portion mismatch for that matter may be indicated in the content synchronization information. Thus, in the example of extra matter at the top of a page, the synchronization device may begin output of the companion audio book starting from a presentation position corresponding to the first word of the physical content that corresponds to the first word narrated in the audio book. In another example in which extra matter comes at the bottom of a page, for example, a footnote, a portion mismatch for the footnote may be indicated in the content synchronization information provided to the synchronization device. Thus, as the portion of the companion audio book is presented synchronously with the visual cue identifying the last line of the page, the user may be prompted to perform a page turn to the next page of the physical book, and/or play back of the audio book may be suspended, after the last word of the corresponding portion of audio content is presented. The user may then take this opportunity to read the footnote, but without being provided the corresponding audio or a visual cue. Thus, synchronous presentation of the companion audio book and the visual cue to the physical book may be maintained and the next portion of the audio content is not presented while a visual cue is being applied to the mismatching footnote. Alternately, audio content corresponding to a footnote may be available, and the user may be given the option listen to that footnote audio content synchronous with the presentation of the visual cue to the footnote. As another alternative, presentation of the companion audio book may stop after the last corresponding portion of the audio content on the page is output, and resume when a portion of the physical book that corresponds to a portion of the audio book is next detected (for example, after the user turns to a page in which a corresponding portion of the physical book is present). Other portion mismatches may be provided for in a similar manner as described in the '483 application, previously incorporated by reference herein. Further examples and methods of synchronously providing audio content and a visual cue may be found in U.S. patent application Ser. No. 13/759,901 ("the '901 application"), filed on Feb. 5, 2013, entitled "SYNCHRONIZING PLAYBACK OF DIGITAL CONTENT WITH PHYSICAL CONTENT," which is hereby incorporated by reference in its entirety and for all purposes.

Figure 4:
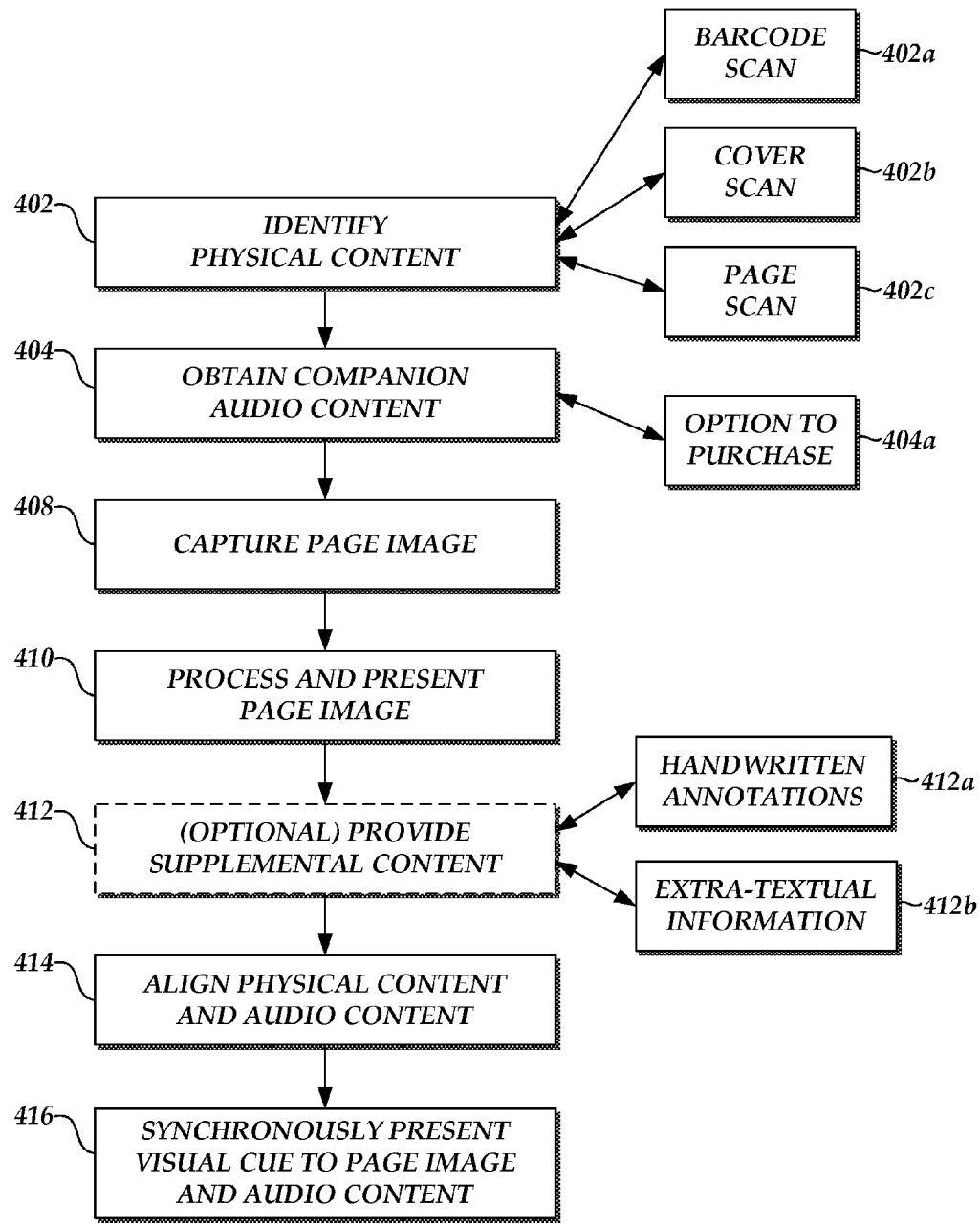
FIG. 4 is a flow diagram depicting an illustrative operation of the content playback synchronization system, according to an embodiment of the present disclosure.

FIG. 4 is a flow diagram depicting an illustrative operation of the content playback synchronization system, according to an embodiment of the present disclosure. The illustrative operation of FIG. 4 may be carried out by, for example, execution of the content detection and alignment module 316 by the content detection and alignment server 206 and/or the synchronization device 104. Alternatively, the operation may be carried out by both the content detection and alignment server 206 and the synchronization device 104, or by another device of the content playback synchronization system, or a combination of devices.

The illustrative operation begins at block 402 in which the physical content to be synchronized is identified. In the instance of a book, the title, author, ISBN, and/or specific edition of the book may be identified. In one embodiment, at block 402a, the physical content is identified by scanning and/or capturing a barcode on the physical book 102 with the camera 108 (referring to FIG. 1A). In another embodiment, at block 402b, the physical content is identified by scanning and/or capturing a cover of the physical book 102 with the camera 108. In yet another embodiment, at block 402c, the physical content is identified by scanning and/or capturing one or more pages of the physical book 102 with the camera 108. Alternatively, the physical content may be identified by taking an image with the camera 108 of the title page, copyright page, or other page of the physical book 102. The image may then be sent to the content detection and alignment server 206, where the content detection and alignment module 316 may detect the words, pictures, numbers, or any other content in the image through, for example, optical character recognition (OCR). Examples of routines, processes, and methods used to accomplish content detection are disclosed in the '483 application, the '864 patent, the '102 patent, and the '901 application, each of which was previously incorporated by reference.

Content detection may be associated with a confidence level for correct detection. Detected content with a confidence level below a certain threshold may be sent to the human interaction task system 210 for further identification and/or confirmation of identification of the physical content. For example, some or all of the physical content (or a copy thereof) may be presented to a human worker of the human interaction task system. A question may also be presented to the human worker, such as "please identify the title of the content." The human worker may interact with a computing device of the human interaction task system to indicate the title of the physical content, and the results may be routed to the content detection and alignment module 316 for use in identifying the companion (or corresponding) audio content for the physical content.

At block 404, audio content corresponding to the identified physical content is obtained from the content data store 208. The obtained companion audio content may then be transmitted to the synchronization device 104. Additionally, synchronization information related to the companion audio content may be transmitted to the synchronization device 104. Examples of systems, routines, processes, and/or methods used to obtain synchronization information are disclosed in the '483 application, the '324 Publication, and the '720 Publication, each of which was previously incorporated by reference.

At this point, the physical content to be read (for example, the title of the physical book) has been identified, and the companion audio content (for example, a corresponding audio book of the same title) has been retrieved. At block 404a, In the event that the physical content has no corresponding audio content, the user may be notified (for example, at the synchronization device 104) and/or given the option to purchase, borrow, lease, etc. the companion audio content when the user currently does not have rights to listen to the audio content. Companion audio content may be retrieved from storage on the synchronization device 104 or from a remote source, such as content data store 208. Similarly, the identity of the physical content may be determined by the synchronization device 104, rather than the content detection and alignment server 206.

At block 408, the synchronization device 104 may be used to detect the current page and/or a page turn. This may be accomplished in a manner similar to the physical content identification described above. The camera 108 or a sensor may be used to detect a page turn, or the presence of content on the current page of the physical book. Additionally, at block 408, an image of the page is captured by the camera 108, again in a manner similar to that described above.

At block 410 the captured page image is processed and presented to the user on the display of the synchronization device. Further, the location for the visual cue and/or highlighting of content may be determined. At optional block 412, supplemental content may optional be provided and included on the page image presented to the user on the synchronization device. The details of blocks 410 and 412 are described in detail below in reference to FIG. 5.

It will be appreciated that specific portion of physical content that is identified will correspond to a specific portion of the companion audio content that will be synchronously played back for the current page. Thus, at block 414 the specific portion of the physical content and corresponding specific portion of the companion audio content are aligned such that specific portion of displayed page of physical content may be illuminated or otherwise identified by the synchronization device 104 as the device 104 synchronously outputs the corresponding portion of companion audio content. Specific details concerning the alignment of audio and physical content are disclosed in the '483 application, the '324 Publication, and the '720 Publication, each of which was previously incorporated by reference.

At block 416, a visual cue to the displayed captured page of physical content and the companion audio content are synchronously presented to the user. For example, the audio content is played through the speaker 110 of the synchronization device 104 as the corresponding words are synchronously illuminated or otherwise identified on the captured page shown on the display 106 with a visual cue. When the end of the page is reached, playback of the audio content may be paused or suspended, and the user may be prompted visually and/or aurally to turn the page. For example, the synchronization device 104 may highlight the page number at the bottom or top of the displayed page when the end of the page is reached. Accordingly, a page turn may be detected again at block 408, and the process depicted in FIG. 4 may repeat for the next page of physical content.

Thus, pages of physical content may be processed, and detection and synchronization information may be generated, in real-time, or near real-time, as the user turns the pages of the physical content. The displayed captured pages of physical content may be illuminated or otherwise identified during synchronous presentation of corresponding digital content without preprocessing the physical content in its entirety. In another embodiment, a library of audio content and electronic copies or versions of physical content may be preprocessed before or after a request is made by user. For example, images of all the pages of a specific book may be captured (for example, via rapid scanning) and processed, and content detection and/or synchronization information may be obtained for each page of the book. Alternatively, the content playback synchronization system may make use of preexisting data stores of physical content scans and synchronization information. For example, book page scans are available from a number of online service providers. Additionally, audio content may be synchronized with the previously captured page images. Thus, in this embodiment physical content may be processed before, instead of after, a page turn is detected. This has the advantage of potentially speeding up synchronous presentation of audio content and a visual due to physical content following a page turn.

Figure 5:
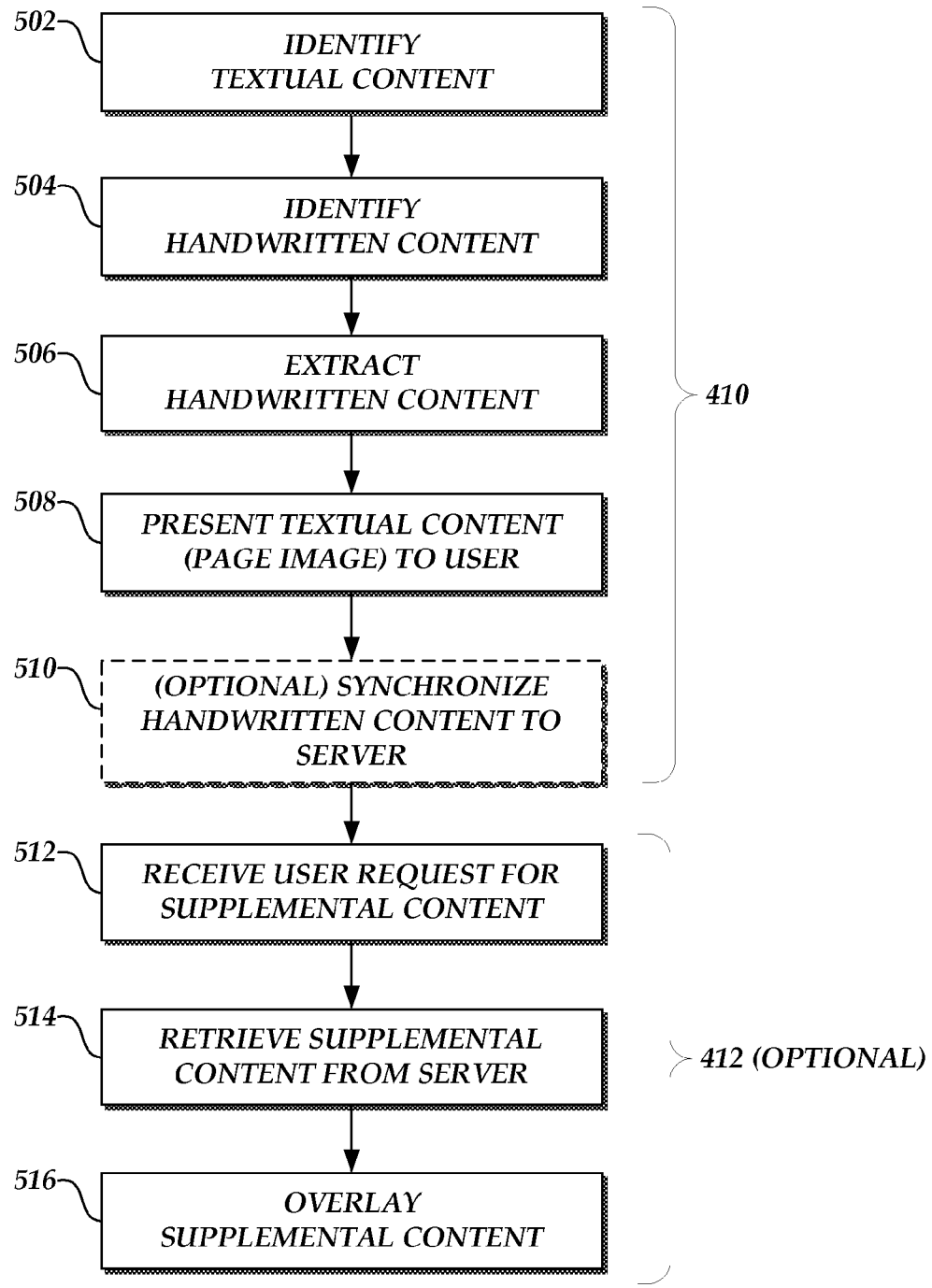
FIG. 5 is a flow diagram depicting another illustrative operation of the content playback synchronization system, according to an embodiment of the present disclosure.

FIG. 5 is a flow diagram depicting the illustrative operations of the content playback synchronization system at blocks 410 and 412 of FIG. 4, according to embodiments of the present disclosure. As with FIG. 4 above, the illustrative operation of FIG. 5 may be carried out by, for example, execution of the content detection and alignment module 316 by the content detection and alignment server 206 and/or the synchronization device 104. Alternatively, the operation may be carried out by both the content detection and alignment server 206 and the synchronization device 104, or by another device of the content playback synchronization system, or a combination of devices.

As mentioned above, at block 410 of FIG. 4, corresponding to blocks 502, 504, 506, 508, and 510 of FIG. 5, the page image is processed and presented to the user on the synchronization device. The processing of the page image may be accomplished on the synchronization device 104, and/or on the content detection and alignment server 206. At block 502, the textual content of the captured page image is identified and differentiated from any handwritten content, markings, and/or other user-produced data that may be identified at block 504. The system may differentiate between content that is part of the original content of, for example, a book, and content that may have been added by a user of the book. For example, a book may contain handwritten content that is part of the original content. Such handwritten content may thus be differentiated from any reader-added handwritten content, or other user-produced content. At blocks 502 and 504, specific portion of content may be detected and/or identified, and the locations and/or coordinates of, for example, words on the page may be determined. The identified handwritten content and markings are then extracted from the page image at block 506, such that, at block 508, the textual content may be presented to the user on the display 106. Thus, the user may select to view the page image without any handwritten markings that may be present in the physical book 102. Alternatively, the textual content may be displayed with the handwritten markings included.

In various embodiments, content other than textual content may be identified (block 502) and presented to the user (block 508). For example, pictures, figures, diagrams, maps, schematics, and the like may be identified and presented to the user on display 106. Such other content may or may not have corresponding audio or digital content that may be presented by the synchronization system, however such content may be identified as part of the original content.

Further, at block 508 the page image may be processed, adjusted, and/or manipulated such that the orientation, shape, and/or alignment of the image is corrected for display on the synchronization device. For example, in an embodiment, the image of the page may be manipulated so that the words are correctly sized and in straight lines when displayed to the user. This may be accomplished even in situations in which the image is captured with the physical book at an angle or other orientation. Manipulations and adjustments to the image may include, for example, deskewing the image, performing keystone correction to the image, and the like. In an embodiment, the image may not be manipulated, but may be displayed to the user in the same orientation and angle as captured.

At optional block 510, the identified handwritten content, markings, and/or other user-produced data extracted from the physical book page image may optionally be transmitted and/or synchronized to the content detection and alignment server 206. The extracted markings may then be stored by the content detection and alignment server 206 in, for example, the content data store 208 for future retrieval. As described below, extracted markings, including markings from books other than the physical book being viewed by the user, may be retrieved from the content detection and alignment server 206 and displayed on the processed page image.

Also as mentioned above, at optional block 412 of FIG. 4, corresponding to blocks 512, 514, and 516 of FIG. 5, supplemental content may optional be provided and included on the page image presented to the user on the synchronization device.

At block 512, a request may be received from the user for supplemental content. The request may be provided in any number of ways including, for example, the user selecting a word or phrase (on the synchronization device and/or the physical book), the user aurally making a request for additional information, the user providing a gesture, the user providing information regarding a specific item of supplemental content desired, and the like. At block 514, the requested supplemental content may be retrieved from the content detection and alignment server 206. Thus, in and embodiment, when the user requests character information regarding a character in the book being read, the relevant supplemental content may be retrieved and displayed to the user on the synchronization device. Alternatively, the user may request particular extracted handwritten notes, which may then be retrieved from the content detection and alignment server 206 and displayed to the user on the synchronization device.

At block 516, the retrieved supplemental content may be displayed to the user as the content is overlaid on the page image displayed to the user. For example, retrieved handwritten markings may be overlaid on the displayed textual content. In another example, supplemental character content may be displayed to the side of, and/or above or below the displayed textual content (for example, the page image). In an embodiment, supplemental content may be displayed in a pop-up window that may overlay the displayed textual content. In an embodiment, supplemental content may be temporarily displayed in place of the textual content. In various embodiments, companion audio content playback may be temporarily suspended while the supplemental content is displayed and/or viewed by the user.

Thus, in an embodiment, handwritten markings from one copy of a book may be extracted, stored, retrieved, and overlaid on an image of the same page from another copy of the same book being read by a user of the content playback synchronization system. Markings and notes may be input into the content playback synchronization system in multiple ways including, for example, through extraction from a physical book, through user gestures on the physical book, through user inputs on the synchronization device, and the like. Thus, for example, the user may underline a passage of text on the synchronization device by selecting the relevant text with a cursor and/or touch input, which underline may then be stored by the content playback synchronization system for future retrieval. In another example, the user may provide a gesture on the physical book that may result in a marking input into the system and stored for future retrieval. In yet another example, handwritten markings may be extracted from various books and input into the system for future retrieval. Thus, in various embodiments, markings (for example, notes, highlighting, and/or underlining, among others) may be aggregated and/or presented to multiple users of the content playback synchronization system. As mentioned above, embodiments of systems and methods of communicating, aggregating, and/or synchronizing user markings may be found in, for example, the '993 patent which was previously incorporated by reference herein.

In various embodiments, supplemental content may include, for example, author information, publisher information, edition information, number of pages, character information, electronically input notes and markings, handwritten notes and markings, user-produced markings, and the like.

In various embodiments, the synchronization device may provide a type of augmented reality for physical book interactions. For example, the synchronization device may provide a real-time view of images and/or video captured by the camera, overlaid with relevant content and/or information. In an example, and as described above, as the user views a physical book through the synchronization device, additional information and/or supplemental content regarding the physical book may be displayed (for example, author information, publisher information, edition information, number of pages, and/or character information, among others).

In an embodiment, the synchronization device may provide an indication to the user of the location in the physical book at which reading was last stopped. For example, the user may view the book through the synchronization device (for example, images of the book may be captured real-time and presented to the user) while the synchronization device may provide an overlaid indication (such as an arrow and/or tag) on the images of the physical book (as viewed through the synchronization device) of the page and/or location in the book at which reading was last suspended and/or stopped.

In some embodiments, the synchronization device 104 may provide a visual cue by obscuring displayed content that does not correspond to the audio content synchronously being presented. For example, the synchronization device 104 may block all the content from the user's view, with the exception of the illuminated portion (such as a word) that corresponds to the audio content synchronously being presented. In an embodiment, the display 106 may show a type of "view port" displaying only the portion of the page that corresponds to the audio content synchronously being presented.

In another embodiment, the synchronization device 104 may be embodied in glasses or a headset worn by the user and the visual cue may be provided through the glasses or headset. For example, the visual cue may be produced on the lens or lenses of the glasses in the user's line of sight. Thus, the user may perceive the visual cue identifying the specific portion of physical content subject to synchronous presentation. Alternatively, the glasses may obscure the portions of the physical content with the exception of the illuminated portion that is subject to the synchronous presentation.

In an embodiment, physical content of the synchronization system may comprise a map, schematic, diagram, painting, or the like. Further, the companion content may comprise content that includes, for example, descriptions and other information related to the physical content. For example, in an embodiment, the synchronization system may synchronously highlight or otherwise emphasize landmarks on a captured image of a map as companion content plays back information about the highlighted landmarks. In this embodiment, the synchronization system may detect visibly differentiable entities, such as landmarks, items, icons, and the like, and emphasize those entities as described above.

While the disclosure herein discusses examples of synchronously presenting content for illustrative purposes, the principles and advantages described herein may be applied to other ways of synchronizing content. Any combination of features described herein may be applied to other forms of content synchronization, as appropriate. For example, content synchronization information can be used to switch back and forth between presenting audio content and textual content (in embodiments where textual content is presented by the synchronization device 104). More specifically, in some embodiments, a computing device may display the text of a book and then switch to playing the audio of an audio book at a corresponding position using the content synchronization information. As another example, the principles and advantages described herein can be used to synchronize companion content on different computing devices outside the context of synchronously presenting companion content. For instance, any combination of features described herein can be applied to any of the examples of synchronizing content on different computing devices described in the '324 Publication, the '998 Publication, the '483 application, and the '720 Publication, each of which were incorporated by reference in their entireties above.

Thus, a user of the content playback synchronization system may advantageously read displayed captured pages of a physical book while simultaneously listening to a companion audio book. Advantageously, words and other content in the displayed page may be synchronously highlighted as the audio book is played back, obviating the need for manual synchronization of content.

Depending on the embodiment, certain acts, events, or functions of any of the processes or algorithms described herein may be performed in a different sequence, may be added, may be merged, and/or may be left out altogether (for example, not all described operations or events are necessary for the practice of the process or algorithm). Moreover, in certain embodiments, operations or events may be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The steps of a method, process, routine, or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of a non-transitory computer-readable storage medium. An example storage medium may be coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A device for synchronizing output of an audio book with a corresponding physical book, the device comprising:
   an image capture device configured to capture an image of a section of a physical book;
   a processor configured to:
      adjust an alignment of text in the image;
      determine a boundary that encloses a word of the text in the image;
      identify a portion of the image within the boundary; and
      apply an emphasis to the portion of the image;
   a display device configured to display the image;
   an audio output device configured to output an audio book corresponding to the physical book; and
   a data store configured to store synchronization information for associating the word with a corresponding portion of the audio book,
   wherein the processor is in communication with the image capture device, the display device, the audio output device, and the data store, and wherein the processor is further configured to:
      cause the display device to display the image, including the portion to which the emphasis has been applied, as the corresponding portion of the audio book is being audibly output by the audio output device, based at least in part on the synchronization information.

2. The device of claim 1, wherein the processor is further configured to adjust the alignment of the text in the image by:
   adjusting at least one of: an orientation, an angle, or a skew of the image.

3. The device of claim 1, wherein the processor is further configured to:
   determine a second boundary that encloses a second word of the text in the image;
   identify a second portion of the image within the second boundary;
   apply an emphasis to the second portion of the image; and
   cause the display device to display the image, including the second portion to which the emphasis has been applied, as a second corresponding portion of the audio book associated with the second word is being audibly output by the audio output device, based at least in part on the synchronization information indicating an advancing position in the audio book.

4. The device of claim 1, wherein the processor is further configured to apply the emphasis to the portion of the image by least one of: re-rendering the portion of the image, emphasizing the portion of the image, underlining the portion of the image, boxing the portion of the image, circling the portion of the image, pointing to the portion of the image, illuminating the portion of the image, or obscuring another portion of the image.

5. The device of claim 2, wherein the alignment of text in the image is adjusted by adjusting the orientation of the image, and wherein the processor is further configured to adjust an orientation of the image by:
   determining an offset in an orientation of the text in the image;
   reorienting the image to correct the offset.

6. The device of claim 2, wherein the alignment of text in the image is adjusted by adjusting the angle of the image, the processor is further configured to adjust an angle of the image by:
   determining an offset in an angle of the text in the image;
   adjusting the image to correct the offset.

7. The device of claim 2, wherein the alignment of text in the image is adjusted by adjusting the skew of the image, the processor is further configured to adjust a skew of the image by:
   determining an offset in a skew of the text in the image;
   deskewing the image to correct the offset.

8. The device of claim 1, wherein the processor is further configured to:
   detect an end of the section of the physical book based on the image; and
   suspend output of the audio book by the audio output device when the portion of the image is at the end of the section.

9. The device of claim 1, wherein the processor is further configured to:
   cause the display device to display the image, including the portion to which the emphasis has been applied, by providing a tactile cue of the portion that is emphasized.

10. The device of claim 1, wherein the processor is further configured to:
    determine an identity of the physical book by at least:
       capturing a second image of the physical book including identifying information, wherein the identifying information includes at least one of: a cover, a title page, an ISBN, a barcode, an embedded electronic device, a format, or a unique identifier;
       extracting the identifying information from the second image; and
       analyzing the identifying information to identify the physical book; and
    requesting the audio book corresponding to the physical book based on the identity of the physical book.

11. The device of claim 1, wherein the processor is further configured to:

cause overlay on the image of an item of supplemental content associated with the physical book,
wherein the item of supplemental content includes at least one of: author information, publisher information, edition information, a number of pages, character information, handwritten markings, or user-produced data.

12. The device of claim 1, wherein the processor is further configured to:
detect user-produced data from the image of the section of the physical book, wherein the user-produced data includes at least one of handwritten content or other markings made by a user in the physical book.

13. The device of claim 1, wherein the processor is further configured to determine the boundary that encloses the word by at least one of:
recognizing the word using optical character recognition and determining a location and outer boundary of the word in the image, or
determining spatial coordinates of the word in the image and determining a location and outer boundary of the word in the image.

14. A computer-implemented method comprising:
under control of one or more computing devices configured with specific computer executable instructions,
capturing, by an image capture device, an image of a section of a physical book;
adjusting an alignment of text in the image;
determining a boundary that encloses a word of the text in the image;
identifying a portion of the image within the boundary;
applying an emphasis to the portion of the image;
outputting, by an audio output device, an audio book corresponding to the physical book;
accessing a data store configured to store synchronization information for associating the word with a corresponding portion of the audio book; and
causing a display device to display the image, including the portion to which the emphasis has been applied, as the corresponding portion of the audio book is being audibly output by the audio output device, based at least in part on the synchronization information.

15. The computer-implemented method of claim 14, wherein adjusting the alignment of the text in the image further comprises:
adjusting at least one of: an orientation, an angle, or a skew of the image.

16. The computer-implemented method of claim 14 further comprising:
determining a second boundary that encloses a second word of the text in the image;
identifying a second portion of the image within the second boundary;
applying an emphasis to the second portion of the image; and
cause the display device to display the image, including the second portion to which the emphasis has been applied, as a second corresponding portion of the audio book associated with the second word is being audibly output by the audio output device, based at least in part on the synchronization information indicating an advancing position in the audio book.

17. The computer-implemented method of claim 14, wherein applying the emphasis to the portion of the image comprises at least one of: re-rendering the portion of the image, emphasizing the portion of the image, underlining the portion of the image, boxing the portion of the image, circling the portion of the image, pointing to the portion of the image, illuminating the portion of the image, or obscuring another portion of the image.

18. The computer-implemented method of claim 14 further comprising:
detecting an end of the section of the physical book based on the image; and
suspending output of the audio book by the audio output device when the portion of the electronically manipulated image is at the end of the section.

19. The computer-implemented method of claim 14 further comprising:
determining an identity of the physical book by at least:
capturing a second image of the physical book including identifying information, wherein the identifying information includes at least one of: a cover, a title page, an ISBN, a barcode, an embedded electronic device, a format, or a unique identifier;
extracting the identifying information from the second image; and
analyzing the identifying information to identify the physical book; and
requesting the audio book corresponding to the physical book based on the identity of the physical book.

20. The computer-implemented method of claim 14 further comprising:
cause overlay on the image of an item of supplemental content associated with the physical book,
wherein the item of supplemental content includes at least one of: author information, publisher information, edition information, a number of pages, character information, handwritten markings, or user-produced data.

21. A system for synchronizing output of an audio book with a corresponding physical book, the system comprising:
a synchronization device comprising:
an image capture device configured to capture an image of a section of a physical book;
a processor configured to:
adjust an alignment of text in the image;
determine a boundary that encloses a word of the text in the image;
identify a portion of the image within the boundary; and
apply an emphasis to the portion of the image;
a display device configured to display the image; and
an audio output device configured to output an audio book corresponding to the physical book,
wherein the processor is in communication with the image capture device, the display device, and the audio output device; and
a remote data store in communication with the synchronization device and configured to store synchronization information for associating the word with a corresponding portion of the audio book,
wherein the processor is further configured to:
access the synchronization information from the remote data store; and
cause the display device to display the image, including the portion to which the emphasis has been applied, as the corresponding portion of the audio book is being audibly output by the audio output device, based at least in part on the synchronization information.

22. The system of claim 21, wherein the processor is further configured to:
determine a second boundary that encloses a second word of the text in the image;

identify a second portion of the image within the second boundary;

apply an emphasis to the second portion of the image; and cause the display device to display the image, including the second portion to which the emphasis has been applied, as a second corresponding portion of the audio book associated with the second word is being audibly output by the audio output device, based at least in part on the synchronization information indicating an advancing position in the audio book.

23. The system of claim 21, wherein the processor is further configured to apply the emphasis to the portion of the image by least one of: re-rendering the portion of the image, emphasizing the portion of the image, underlining the portion of the image, boxing the portion of the image, circling the portion of the image, pointing to the portion of the image, illuminating the portion of the image, or obscuring another portion of the image.

24. The system of claim 21, wherein the processor is further configured to:

determine an identity of the physical book by at least:

capturing a second image of the physical book including identifying information, wherein the identifying information includes at least one of: a cover, a title page, an ISBN, a barcode, an embedded electronic device, a format, or a unique identifier;

extracting the identifying information from the second image; and analyzing the identifying information to identify the physical book; and requesting the audio book corresponding to the physical book based on the identity of the physical book.

25. The system of claim 21, wherein the processor is further configured to:

detect user-produced data from the image of the section of the physical book, wherein the user-produced data includes at least one of handwritten content or other markings made by a user in the physical book.

26. The system of claim 21, wherein the processor is further configured to determine the boundary that encloses the word by at least one of:

recognizing the word using optical character recognition and determining a location and outer boundary of the word in the image, or determining spatial coordinates of the word in the image and determining a location and outer boundary of the word in the image.

\* \* \* \* \*